United States Patent
Lee et al.

(10) Patent No.: US 10,372,211 B2
(45) Date of Patent: Aug. 6, 2019

(54) APPARATUS AND METHOD FOR PROVIDING HAPTIC FEEDBACK TO INPUT UNIT

(71) Applicant: Samsung Electronics Co., Ltd., Gyeonggi-do (KR)

(72) Inventors: Ju-Youn Lee, Gyeonggi-do (KR); Jin-Hyoung Park, Gyeonggi-do (KR); Sang-Hyup Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 324 days.

(21) Appl. No.: 14/193,629

(22) Filed: Feb. 28, 2014

(65) Prior Publication Data

US 2014/0245139 A1 Aug. 28, 2014

(30) Foreign Application Priority Data

Feb. 28, 2013 (KR) .................. 10-2013-0022387

(51) Int. Cl.
*G06F 3/01* (2006.01)
*G06F 3/0484* (2013.01)
(Continued)

(52) U.S. Cl.
CPC .......... *G06F 3/016* (2013.01); *G06F 3/03545* (2013.01); *G06F 3/0488* (2013.01);
(Continued)

(58) Field of Classification Search
CPC .............. G06F 3/0488; G06F 3/04883; G06F 3/04842; G06F 3/0416; G06F 3/016;
(Continued)

(56) References Cited

U.S. PATENT DOCUMENTS

| 6,545,669 | B1 * | 4/2003 | Kinawi et al. ............... 345/173 |
| 2005/0071761 | A1 | 3/2005 | Kontio |

(Continued)

FOREIGN PATENT DOCUMENTS

| CN | 1977234 | 6/2007 |
| CN | 102725711 | 10/2012 |

(Continued)

OTHER PUBLICATIONS

Chinese Office Action dated Mar. 1, 2017 issued in counterpart application No. 201480011003.3, 28 pages.

(Continued)

*Primary Examiner* — Ting Z Lee
(74) *Attorney, Agent, or Firm* — The Farrell Law Firm, P.C.

(57) ABSTRACT

Methods and apparatus for providing feedback in a portable apparatus are provided. An object is displayed on a touch screen of the portable apparatus. A first touch, from an input unit, is detected at a position on the touch screen corresponding to the displayed object. The object is selected in response to the first touch. A copy command by which the selected object is copied to a copy target is received from the input unit. A first control command corresponding to haptic feedback determined in response to the received copy command is transmitted from the portable apparatus to the input unit.

23 Claims, 19 Drawing Sheets

(51) Int. Cl.
*G06F 3/0488* (2013.01)
*G06F 3/041* (2006.01)
*G06F 3/0481* (2013.01)
*G06F 3/0354* (2013.01)
*G06Q 40/00* (2012.01)

(52) U.S. Cl.
CPC ...... *G06F 3/04812* (2013.01); *G06F 3/04842* (2013.01); *G06F 3/0416* (2013.01); *G06F 3/04883* (2013.01); *G06Q 40/00* (2013.01); *H04M 2203/401* (2013.01); *H04M 2203/5036* (2013.01)

(58) Field of Classification Search
CPC . G06F 3/04812; G06F 3/03545; G06Q 40/00; H04M 2203/401; H04M 2203/5036
USPC .................. 715/769, 770; 345/173, 179, 180
See application file for complete search history.

(56) References Cited

U.S. PATENT DOCUMENTS

| | | | |
|---|---|---|---|
| 2005/0173514 A1* | 8/2005 | Mackenzie | G06F 17/30876 235/375 |
| 2006/0132460 A1 | 6/2006 | Kolmykov-Zotov et al. | |
| 2006/0158440 A1 | 7/2006 | Ashenbrenner | |
| 2006/0262106 A1* | 11/2006 | Suk | 345/179 |
| 2009/0160763 A1 | 6/2009 | Cauwels et al. | |
| 2010/0090971 A1* | 4/2010 | Choi et al. | 345/173 |
| 2010/0194547 A1 | 8/2010 | Terrell et al. | |
| 2010/0235793 A1* | 9/2010 | Ording et al. | 715/863 |
| 2011/0163860 A1 | 7/2011 | Ryu et al. | |
| 2011/0185299 A1* | 7/2011 | Hinckley et al. | 715/769 |
| 2011/0185318 A1 | 7/2011 | Hinckley et al. | |
| 2011/0267182 A1* | 11/2011 | Westerinen et al. | 340/407.2 |
| 2012/0127088 A1 | 5/2012 | Pance et al. | |
| 2012/0127110 A1* | 5/2012 | Amm et al. | 345/174 |
| 2012/0128088 A1 | 5/2012 | Ko et al. | |
| 2013/0076668 A1* | 3/2013 | Maeda | 345/173 |
| 2013/0125018 A1* | 5/2013 | Park et al. | 715/748 |
| 2013/0154956 A1* | 6/2013 | Tudosoiu | 345/173 |
| 2013/0154987 A1 | 6/2013 | Kido | |
| 2013/0238744 A1* | 9/2013 | Paschke | G06F 9/543 709/216 |
| 2014/0043245 A1* | 2/2014 | Dowd et al. | 345/173 |
| 2014/0146021 A1* | 5/2014 | Trethewey et al. | 345/179 |

FOREIGN PATENT DOCUMENTS

| | | |
|---|---|---|
| EP | 2 461 228 | 6/2012 |
| RU | 2 451 324 | 5/2012 |
| WO | WO 2012/026076 | 3/2012 |

OTHER PUBLICATIONS

Russian Office Action dated Mar. 14, 2018 issued in counterpart application No. 2015140993/08, 11 pages.

* cited by examiner

… (1)

APPARATUS AND METHOD FOR PROVIDING HAPTIC FEEDBACK TO INPUT UNIT

PRIORITY

This application claims the priority under 35 U.S.C. § 119(a) to Korean Application Serial No. 10-2013-0022387, which was filed in the Korean Intellectual Property Office on Feb. 28, 2013, the entire content of which is incorporated herein by reference.

BACKGROUND OF THE INVENTION

1. Field of the Invention

The present invention relates generally to a portable apparatus and a method for providing haptic feedback to an input unit, and more particularly, to a portable apparatus and a method for providing haptic and/or auditory feedback from an input unit through a touch interaction generated between the input unit and a portable apparatus.

2. Description of the Related Art

The number of services and functions provided by portable apparatuses is continually increasing. Various applications that are executable in portable apparatuses are being developed to increase the usability of the portable apparatuses and to satisfy various demands of users.

Accordingly, one or more applications may be stored in portable apparatuses, such as, for example, smart phones, mobile phones, notebook Personal Computers (PCs), and tablet PCs, which can be carried by users and include touch screens. Shortcut icons for executing the stored applications are displayed on the touch screens of the portable apparatuses. Thus, a user can select (for example, by a touch) any one of the shortcut icons displayed on the touch screen to execute a desired application in a portable apparatus. Various types of objects such as, for example, widgets, pictures, videos, or documents, as well as shortcut icons are displayed on the touch screen of the portable apparatus.

The portable apparatus provides a touch input method using an input unit, such as, for example, a finger of the user, a stylus or an electronic pen, to select the displayed objects. Further, the touch input unit includes a non-contact input method such as hovering.

When a touch input by a user occurs on a touch screen, vibrations are generated through vibration elements in the portable apparatus so that a user is provided with a feeling as if a button is physically pressed.

SUMMARY OF THE INVENTION

The present invention has been made to address at least the above problems and/or disadvantages and to provide at least the advantages described below. Accordingly, an aspect of the present invention provides a portable apparatus and a method for outputting haptic and/or auditory feedback from an input unit through a touch interaction generated between the input unit and a portable apparatus.

Another aspect of the present invention provides a portable apparatus and a method for providing control information corresponding to haptic and/or auditory feedback output from an input unit through a touch interaction for a copy-and-paste generated between the input unit and the portable apparatus.

Another aspect of the present invention provides a portable apparatus and a method for providing control information corresponding to haptic feedback output from an input unit to a user, and auditory feedback provided selectively in response to a copy command and a paste command received by the input unit between the input unit and the portable apparatus.

Another aspect of the present invention provides a portable apparatus and a method for providing visual feedback to a touch screen of the portable apparatus in response to a copy command and a paste command generated by an input unit between the input unit and the portable apparatus.

Another aspect of the present invention provides a portable apparatus and a method for providing haptic and auditory feedbacks from the portable apparatus in response to a copy command and a paste command generated by an input unit between the input unit and the portable apparatus.

In accordance with an aspect of the present invention, a feedback providing method of a portable apparatus is provided. An object is displayed on a touch screen of the portable apparatus. A first touch, from an input unit, is detected at a position on the touch screen corresponding to the displayed object. The object is selected in response to the first touch. A copy command by which the selected object is copied to a copy target is received from the input unit. A first control command corresponding to haptic feedback determined in response to the received copy command is transmitted from the portable apparatus to the input unit.

In accordance with another aspect of the present invention, a portable apparatus is provided that includes a touch screen that displays an object, a communication unit that communicates with an input unit, and a controller that controls the touch screen and the communication unit. The controller performs a control to select the object in response to a first touch, from the input unit, at a position on the touch screen corresponding to the displayed object, and to transmit a first control signal to the input unit through the communication unit. The first control signal corresponds to haptic feedback determined in response to a copy command for copying the object received from the input unit to a copy target.

In accordance with another aspect of the present invention, a feedback control method of an input unit is provided. A copy command, for copying an object selected from a touch screen of the portable apparatus, is transmitted from the input unit to the portable apparatus. A first control signal corresponding to the copy command is received from the portable apparatus. Haptic feedback corresponding to the received first control signal is output through a pen vibrating element of the input unit.

In accordance with another aspect of the present invention, an input unit is provided that includes a pen vibrating element, a pen communication unit that communicates with a portable apparatus, and a controller that controls the pen vibrating element and the pen communication unit. The controller performs a control to transmit a copy command for copying an object selected from a touch screen of the portable apparatus to the portable apparatus through the pen communication unit, and to output haptic feedback corresponding to a first control signal received from the portable apparatus through the pen communication unit, through the pen vibrating element.

Another aspect of the present disclosure provides a computer program comprising instructions arranged, when executed, to implement a method in accordance with any one of the above-described aspects. A further aspect provides machine-readable storage storing such a program.

Various respective aspects and features of the present disclosure are defined in the appended claims.

It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
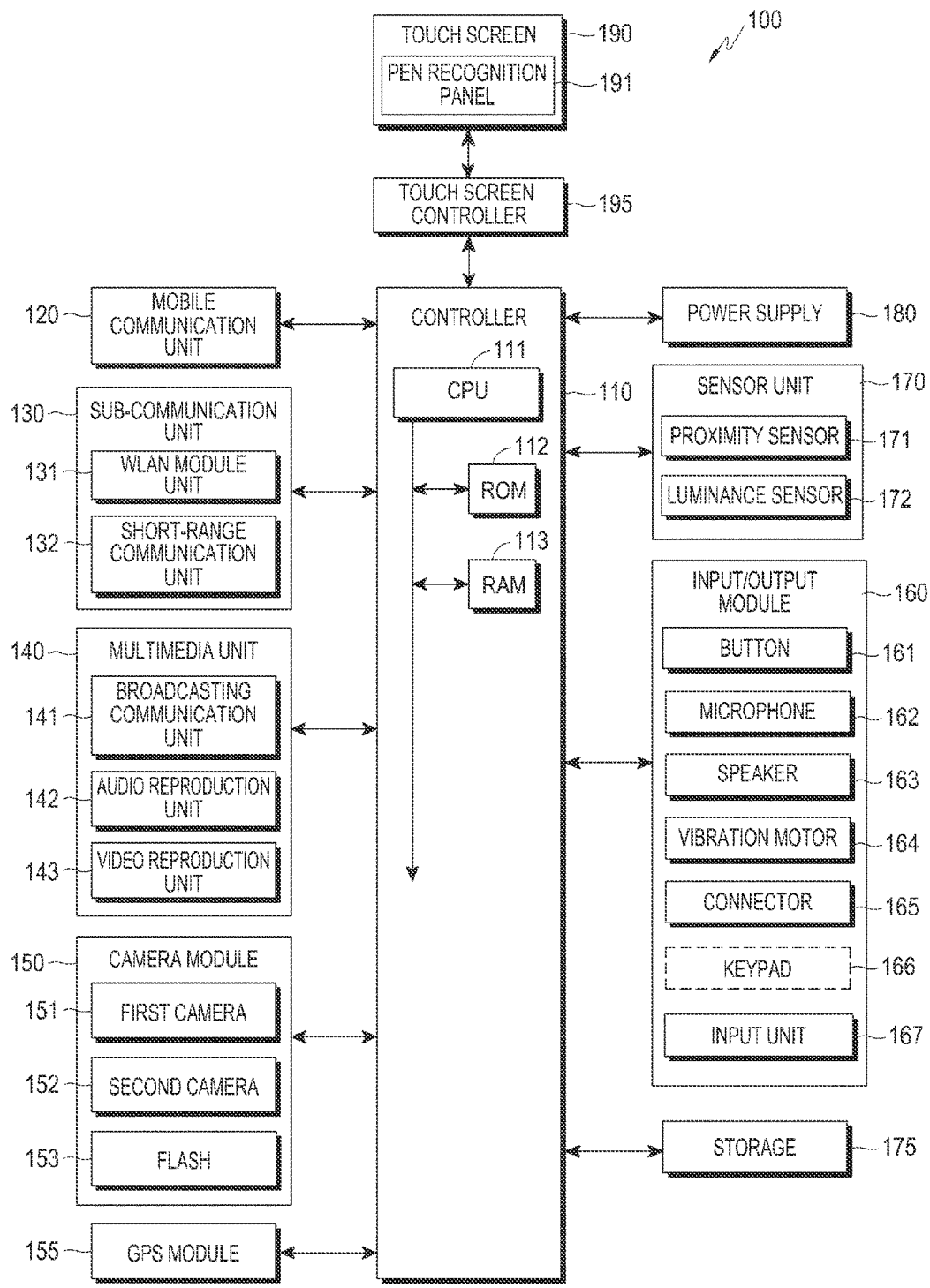
FIG. 1 is a block diagram illustrating a portable apparatus, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms including ordinal numbers, such as first and second, may be used to describe various constituent elements, but the elements are not limited by the terms. The terms are used only to distinguish one element from other elements. For example, a first element may be named a second element without departing from the scope of the present invention, and a second element may be named a first element similarly. The term and/or includes a combination of a plurality of items or any one of a plurality of items.

The terms herein are used only to describe specific embodiments of the present invention, and are not intended to limit the present invention. A singular expression includes a plural expression unless differently defined explicitly in the context. In particular, where the indefinite article is used, the specification is to be understood as contemplating plurality as well as singularity, unless the context requires otherwise.

In addition, since terms, such as "including," "comprising," and "having" mean that one or more corresponding components may exist unless they are specifically described to the contrary, it shall be construed that one or more other components can be included. Furthermore, throughout the description and claims of this specification, the words "comprise" and "contain" and variations of the words, for example "comprising" and "comprises", mean "including but not limited to", and are not intended to (and do not) exclude other components, integers or steps.

FIG. 1 is a block diagram illustrating a portable apparatus, according to an embodiment of the present invention.

Referring to FIG. 1, a portable apparatus 100 may be connected to an external apparatus by using a mobile communication unit 120, a sub-communication unit 130, and/or a connector 165. The external apparatus may be another portable apparatus, a mobile phone, a smart phone, an input unit, a tablet PC, or a server. The portable apparatus 100 is an apparatus that can be carried and that can transmit and receive data, and may include at least one touch screen. The portable apparatus may be embodied as a mobile phone, a smart phone, a tablet PC, a 3-Dimensional Television (3D-TV), a smart TV, a Light Emitting Diode (LED) TV, and a Liquid Crystal Display (LCD) TV, and also includes an apparatus which can transmit and receive data to and from a peripheral apparatus or another remotely located apparatus.

The portable apparatus 100 includes a touch screen 190 and a touch screen controller 195. The portable apparatus 100 also includes a controller 110, the mobile communication unit 120, the sub-communication unit 130, a multimedia unit 140, a camera unit 150, a Global Positioning System (GPS) unit 155, an input/output module 160, a sensor unit 170, a storage 175, and a power supply 180. The sub-communication unit 130 includes at least one of a Wireless Local Area Network (WLAN) module unit 131 and a short-range communication unit 132. The multimedia unit 140 includes at least one of a broadcasting communication unit 141, an audio reproduction unit 142, and a video reproduction unit 143. The camera unit 150 includes at least one of a first camera 151, a second camera 152, and a flash 153. The input/output module 160 includes at least one of a button 161, a microphone 162, a speaker 163, a vibration motor 164, the connector 165, a keypad 166, and an input unit 167. The sensor unit 170 includes a proximity sensor 171 and a luminance sensor 172.

The controller 110 includes an Application Processor (AP) or Central Processing Unit (CPU) 111, a Read Only Memory (ROM) 112 for storing a control program for control of the portable apparatus 100, and a Random Access Memory (RAM) 113 for storing a signal or data input from the outside of the portable apparatus 100 or used as a memory area for an operation performed by the portable apparatus 100.

The controller 110 performs functions of controlling an overall operation of the portable apparatus 100 and a signal flow between internal elements 120 to 195 of the portable apparatus 100, and of processing data. The controller 110 performs a control to supply electric power from the power supply 180 to the internal elements 120 to 195. The controller 190 executes an Operating System (OS) and an application stored in the storage 175.

The CPU 111 may include a Graphic Processing Unit (GPU) for processing graphics. A core and a GPU of the CPU 111 may constitute a System on Chip (SoC). The CPU 111 may include a single core, a dual core, a triple core, a quad core, or an integer times core. The CPU 111, the ROM 112, and the RAM 113 may be connected to each other through an internal bus.

The controller 110 may control the mobile communication unit 120, the sub-communication unit 130, the multimedia unit 140, the camera unit 150, the GPS unit 155, the input/output unit 160, the sensor unit 170, the storage 175, the power supply 180, the touch screen 190, and the touch screen controller 195.

The controller 110, according to an embodiment of the present invention, may perform a control to display at least one object on the touch screen, detect a first touch by the input unit from the touch screen, receive a copy command for copying the object determined by the first touch to a copy target from the input unit in response to the first touch, and transmit a first control command, corresponding to haptic feedback determined in response to the received copy command, to the input unit.

The controller 110 may perform a control to display visual feedback corresponding to the copy command on the touch screen, and provide the visual feedback in at least one of a selected object and a new object.

The controller 110 may perform a control to display visual feedback by which a current size of the selected object is transitioned to a predetermined size at a constant speed, and is moved to a location where a touch of the input unit is detected on the touch screen.

The controller 110 may perform a control to display visual feedback by which a liquid is suctioned by a pipette, which is a new object.

The controller 110 may perform a control to transmit copy information corresponding to the copy command of the input unit to one of the input unit and an external server.

The controller 110 may perform a control to receive device information of the input unit from the input unit, and transmit the copy information to one of the input unit and the external server based on the received device information.

The controller 110 may perform a control to display, on the touch screen, a selectable copy icon corresponding to execution of a copy by a selected object in response to a touch gesture of the input unit.

The controller 110 may perform a control to detect a second touch of the input unit from the touch screen, receive, from the input unit, a paste command for pasting the copied object at a paste location where the object copied in response to the second touch is to be pasted, transmit, to the input unit, a second control command corresponding to haptic feedback determined in response to the received paste command, and display the copied object at the paste location.

The controller 110 may perform a control to display visual feedback corresponding to the paste command on the touch screen.

The controller 110 may perform a control to display visual feedback by which a size of the object is transitioned to an original size, before the object was copied to the touch screen, at a constant speed, and is moved to a selected paste location.

The controller 110 may perform a control to display visual feedback by which a liquid is discharged from a pipette, which is a new object on the touch screen.

The controller 110 may perform a control to receive copy information corresponding to the paste command from at least one of the input unit and the external server through a communication unit.

The controller 110 may perform a control to display a selectable paste icon corresponding to execution of a paste of an object, which is to be copied, in response to a touch gesture of the input unit, on the touch screen.

The mobile communication unit 120 connects the portable apparatus 100 to an external apparatus through a mobile communication by using one or a plurality of antennas under the control of the controller. The mobile communication unit 120 transmits and receives a wireless signal for a voice communication, a video communication, a Short Message Service (SMS), a Multimedia Message Service (MMS), and a data communication to and from a mobile phone, a smart phone, a tablet PC, or another portable apparatus, which has a phone number input to the portable apparatus 100.

The sub-communication unit 130 may include only the WLAN module unit 131, only the short-range communication unit 132, or both the WLAN module unit 131 and the short-range communication unit 132.

The WLAN module unit 131 may be connected to the Internet by using wireless communications at a place where an Access Point (AP) is installed under the control of the controller. The WLAN module unit 131 supports a WLAN standard (IEEE802.11x) of Institute of Electrical and Electronics Engineers (IEEE). The short-range communication unit 132 may wirelessly perform a short-range communication between the portable apparatus 100 and the external apparatus under the control of the controller. The short-range communication may include Bluetooth, Infrared Data Association (IrDA), and Near Field Communication (NFC).

The portable apparatus 100 may include at least one of the mobile communication unit 120, the wireless LAN unit 131, and the short-range communication unit 132, according to performance. For example, the portable apparatus 100 may include a combination of the mobile communication unit 120, the wireless LAN unit 131, and the short-range communication unit 132.

In an embodiment of the present invention, the term "communication unit" includes the mobile communication unit 120 and the sub-communication unit 130. According to an embodiment of the present invention, the communication unit may receive device information of the input unit 167 from the input unit 167 under the control of the controller.

The communication unit may transmit control information corresponding to a copy command of the input unit 167, to the input unit 167, under the control of the controller. The communication unit may transmit copy information corresponding to a copy command of the input unit 167, to the input unit 167 or the external server, under the control of the controller.

The communication unit may transmit control information corresponding to a paste command of the input unit 167, to the input unit 167, under the control of the controller. The communication unit may receive copy information corresponding to a paste command of the input unit 167, from the input unit 167 or the external server, under the control of the controller.

The broadcasting communication unit 141 may receive a broadcasting signal (for example, a TV broadcasting signal, a radio broadcasting signal, or a data broadcasting signal) transmitted from an external broadcasting station and broadcasting added information (for example, Electric Program Guide (EPG) or Electric Service Guide (ESG)) through a broadcasting communication antenna, and may reproduce the broadcasting signal and the broadcasting added information by using a touch screen, a video codec unit, and an audio codec unit under the control of the controller.

The audio reproduction unit 142 may reproduce an audio source (for example, an audio file whose file extension is mp3, wma, ogg, or way), stored in the storage 175 of the portable apparatus 100 or received from outside of the portable apparatus 100, by using an audio codec unit under the control of the controller.

According to an embodiment of the present invention, the audio reproduction unit 142 may reproduce auditory feedback (for example, output of an audio source corresponding to a command stored in the storage in advance), corresponding to a copy command of the input unit 167, by using an audio codec unit under the control of the controller. The audio reproduction unit 142 may reproduce an auditory feedback, corresponding to a paste command of the input unit 167, by using an audio codec unit under the control of the controller.

The video reproduction unit 143 may reproduce a digital video file (for example, a file whose file extension is mpeg, mpg, mp4, avi, mov, or mkv), stored in the storage 175 of the portable apparatus 100 or received from the outside of the portable apparatus 100, by using a video codec unit under the control of the controller. Most of the applications that can be installed in the portable apparatus 100 may reproduce audio and video by using an audio codec unit or a video codec unit.

According to an embodiment of the present invention, the video reproduction unit 142 may reproduce visual feedback, corresponding to a copy command of the input unit 167, by using a video codec unit under the control of the controller. The video reproduction unit 142 may reproduce visual feedback, corresponding to a paste command of the input unit 167, by using a video codec unit under the control of the controller.

It will be easily understood by those skilled in the art that many types of video and audio codec units are produced and circulated. The video reproduction unit 143 may reproduce an audio source by using a video codec unit and an audio codec unit.

The multimedia unit 140 may include the audio reproduction unit 142 and the video reproduction unit 143, and not the broadcasting communication unit 141. The audio reproduction unit 142 or the video reproduction unit 143 of the multimedia unit 140 may be included in the controller 100. In an embodiment of the present invention, the term "video codec unit" includes one or more video codec units. In an embodiment of the present invention, the term "audio codec unit" includes one or more audio codec units.

The camera unit 150 may include at least one of the first camera 151 on a front surface 100a and the second camera 152 on a rear surface 100c, for photographing a still image or a video under the control of the controller. The camera unit 150 may include one or both of the first camera 151 and the second camera 152. The first camera 151 or the second camera 152 may include an auxiliary light source (for example, the flash 153) for providing an amount of light necessary for photographing.

The first camera 151 and the second camera 152 may be located adjacent to an additional camera to capture a 3D image or a 3D video under the control of the controller of the camera unit 150.

The GPS unit 155 periodically receives electromagnetic waves (specifically radio signals including, for example, accurate location information and time information) from a plurality of GPS satellites located in the orbits of the Earth. The portable apparatus 100 may recognize a location, a speed, and a time of the portable apparatus 100 by using electromagnetic waves received from the plurality of GPS satellites.

The buttons 161 include a menu button 161a, a home button 161b, and a back button 161c located at a lower portion of the front surface 100a. The buttons 161 may include a power/lock button 161d on a lateral surface 100b and at least one volume button 161e. The buttons 161 may include only the home button 161a. The buttons 161 may be realized by a touch button instead of a physical button. The buttons 161 may be displayed on the touch screen 190.

The microphone 162 receives a voice or a sound from the outside to generate an electrical signal under the control of the controller. The electrical signal generated by the microphone 162 is converted by the audio codec unit to be stored in the storage 175 or output through the speaker 163. The microphone 162 may be located at one or more of the front surface 100a, the lateral surface 100b, and the rear surface 100c of the portable apparatus 100. At least one microphone may be located only at the lateral surface 100b.

The speaker 163 may output sounds corresponding to various signals (for example, a wireless signal, a broadcasting signal, an audio source, a video file, or photographing of a picture) of the mobile communication unit 120, the sub-communication unit 130, the multimedia unit 140, or the camera unit 150 to the outside of the portable apparatus 100 by using an audio codec unit under the control of the controller.

Figure 2:
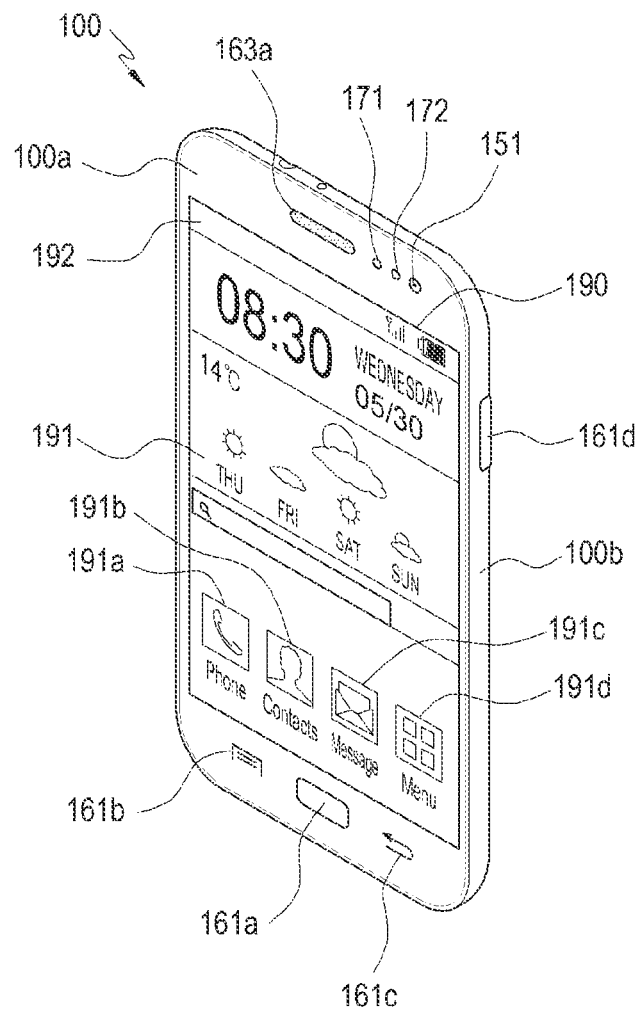
FIG. 2 is a diagram illustrating a front perspective view of the portable apparatus, according to an embodiment of the present invention.
Figure 3:
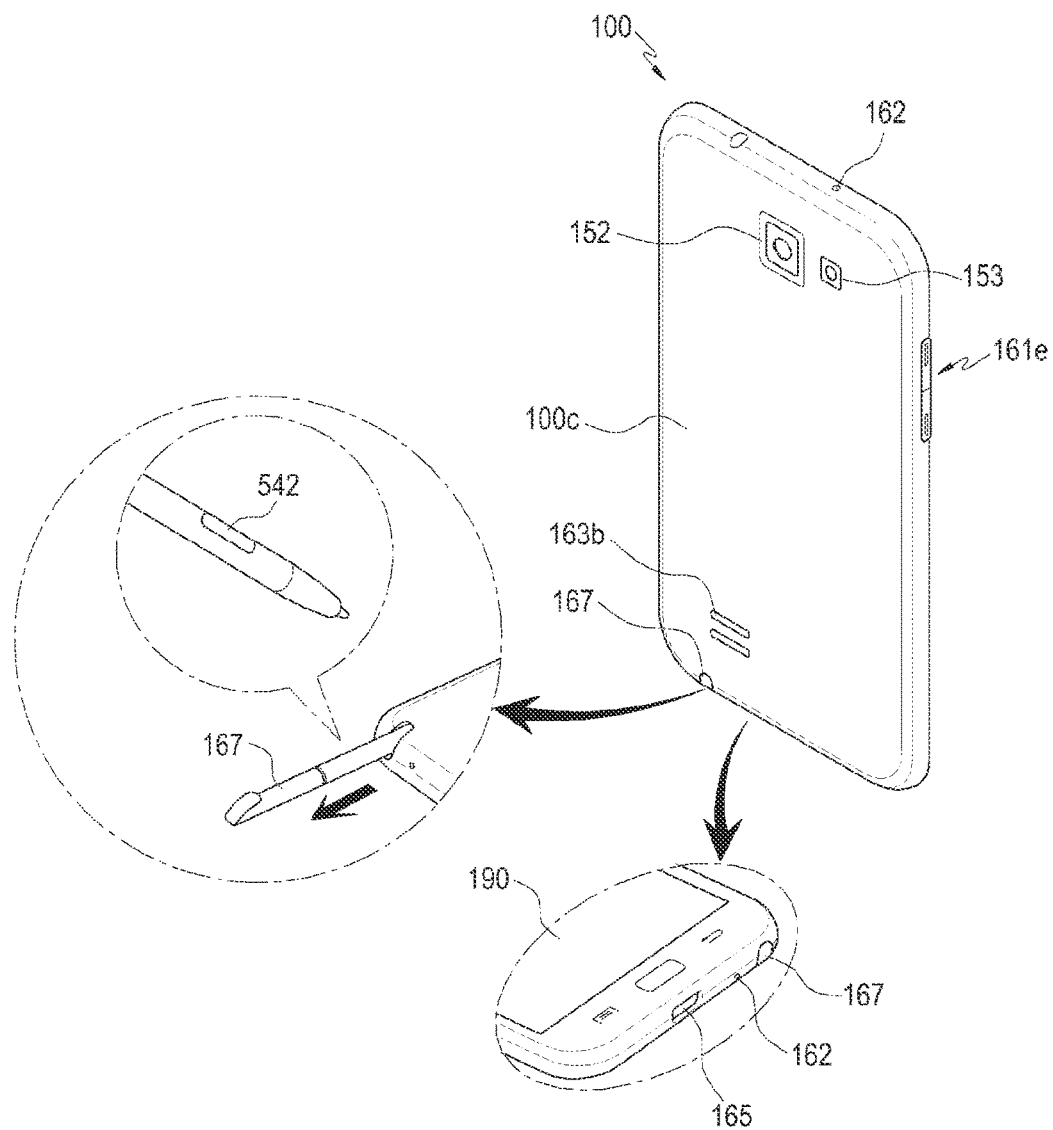
FIG. 3 is a diagram illustrating a rear perspective view of the portable apparatus, according to an embodiment of the present invention.

The speaker 163 may output a sound (for example, a button manipulation sound corresponding to a phone call or a voice communication connection sound) corresponding to a function performed by the portable apparatus 100. At least one speaker 163 may be located on the front surface 100a, the lateral surface 100b, and the rear surface 100c of the portable apparatus 100. As shown in FIGS. 2 and 3, a plurality of speakers 163a and 163b are located on the front surface 100a and the rear surface 100c. A plurality of speakers 163a and 163b may be located on the front surface 100a or one speaker 163a may be located on the front surface 100a and a plurality of speakers (not shown) may be located on the rear surface 100c.

At least one speaker may be located on the lateral surface 100b. The portable apparatus 100 in which at least one speaker is located on the lateral surface 100b may provide a sound output effect which is different from that of the case in which a speaker is located on the front surface 100a and the rear surface 100c.

According to an embodiment of the present invention, the speaker 163 may output auditory feedback corresponding to a copy command of the input unit 167 under the control of the controller. The speaker 163 may output auditory feedback corresponding to a paste command of the input unit 167 under the control of the controller.

The vibration motor 164 may convert an electrical signal into mechanical vibrations under the control of the controller. For example, the vibration motor 164 may include a linear vibration motor, a bar type vibration motor, a coin type vibration motor, or a piezoelectric element vibration motor. When a request for a voice communication is received from another portable apparatus, the vibration motor 164 is operated in the portable apparatus 100 in a vibration mode. One or a plurality of vibration motors 164 may be located in the portable apparatus 100. The vibration motor 164 may vibrate the entire portable apparatus 100 or vibrate only a portion of the portable apparatus 100.

According to an embodiment of the present invention, the vibration motor 164 may output haptic feedback corresponding to a copy command of the input unit 167 under the control of the controller. The vibration motor 164 may output haptic feedback corresponding to a paste command of the input unit 167 under the control of the controller. The vibration motor 164 may provide various haptic feedback (for example, a vibration intensity and a vibration time period) based on a control command to the controller.

The connector 165 may be used as an interface for connecting the portable apparatus 100 to an external apparatus or a power source. Data stored in the storage 175 of the portable apparatus 100 may be transmitted from the external apparatus or data may be received from the external apparatus through a wired cable connected to the connector 165 under the control of the controller. Electric power may be input from the power source or a battery may be charged through a wired cable connected to the connector 165.

The keypad 166 may receive a key input from a user to control the portable apparatus 100. The keypad 166 includes a physical keypad formed in the portable apparatus 100 or a virtual keypad displayed on the touch screen 190. The physical keypad formed in the portable apparatus 100 may be excluded according to a performance or structure of the portable apparatus 100.

The input unit 167 may touch or select at least one object (for example, a menu, text, an image, a figure, and an icon) displayed on the touch screen 190 of the portable apparatus 100. The input unit 167 may input a character by touching a capacitive, resistive, or electromagnetically inductive touch screen or by using a virtual keyboard. For example, the input unit 167 includes a stylus or a haptic pen in which an embedded pen vibrating element 544 (for example, a vibration motor or an actuator) vibrates by using control information received from a communication unit of the portable apparatus 100. The vibration element may vibrate by using sensing information detected by a sensor (for example, an acceleration sensor) embedded in the haptic pen 167 instead of using control information received from the portable apparatus 100. The input unit will be described in greater detail below with reference to FIGS. 4 and 5.

The sensor unit 170 includes at least one sensor for detecting a state of the portable apparatus 100. For example, the sensor unit 170 may include the proximity sensor 171 located on the front surface 100*a* of the portable apparatus 100, a luminance sensor 172 for detecting an amount of light around the portable apparatus 100, an acceleration sensor for detecting inclinations of three axes (for example, the x-axis, the y-axis, and the z-axis) applied to the portable apparatus 100, a gyro sensor for detecting a direction of the portable apparatus 100 by using momentum, a gravity sensor for detecting a direction of gravity, or an altimeter for measuring the atmospheric pressure to detect an altitude of the portable apparatus 100. The sensor unit 170 may measure an acceleration obtained by adding a kinetic acceleration of the portable apparatus and an acceleration of gravity, and may measure only the acceleration of gravity when the portable apparatus 170 is not moved. For example, when the front surface of the portable apparatus 100 faces upward, the gravitational acceleration may be a positive value, and when the rear surface of the portable apparatus 100 faces upward, the gravitational acceleration may be a negative value.

At least one sensor included in the sensor unit 170 generates a signal corresponding to the detection to transmit the signal to the controller. The sensors of the sensor unit 170 may be added or deleted according to a performance of the portable apparatus 100.

The storage unit 175 may store a signal or data that is input or output to correspond to operations of the mobile communication unit 120, the sub-communication unit 130, the multimedia unit 140, the camera unit 150, the GPS unit 155, the input/output unit 160, the sensor unit 170, and the touch screen 190 under the control of the controller. The storage 175 may store a control program for control of the portable apparatus 100 or the controller, GUIs related to applications provided by the manufacturer or downloaded from the outside, images for providing the GUIs, user information, documents, databases, or related data.

The storage 175, according to an embodiment of the present invention, may store device information, a copy command, and a paste command received from the input unit 167. The storage unit 175 may store first touch information (for example, the X and Y coordinates of a touch, a touch time, and the like) corresponding to a first touch input from the input unit 167 or first hovering information (for example, the X, Y, and Z coordinates of hovering, a hovering time, and the like) corresponding to a first hovering. The storage 175 may store visual feedback recognizable by the user and displayed on the touch screen 190 to correspond to a copy command received by the input unit 167, auditory feedback output to the speaker 163, and haptic feedback output by the vibration motor 164. The storage unit 175 may store second touch information corresponding to a second touch input from the input unit 167 or second hovering information corresponding to a second hovering. The storage 175 may store visual feedback recognizable by the user and displayed on the touch screen 190 to correspond to a paste command received by the input unit 167, auditory feedback output to the speaker 163, and haptic feedback output by the vibration motor 164.

In an embodiment of the present invention, the term "storage" includes the storage 175, the ROM 112, and the RAM 113 included in the controller, and a memory card (for example, a micro SD card and a memory stick) mounted to the portable apparatus 100. The storage may include a nonvolatile memory, a volatile memory, a Hard Disk Drive (HDD), or a Solid State Memory (SSM).

The power supply 180 may supply electric power to one or a plurality of batteries located in the portable apparatus 100 under the control of the controller. The one or plurality of batteries may be located between the touch screen located on the front surface 110*a* and the rear surface 110*c*. The power supply 180 may supply electric power input from an external power source through a wired cable connected to the connector 165 of the portable apparatus 100.

The touch screen 190 may provide GUIs corresponding to various services (for example, voice communication, data transmission, broadcasting, photographing a picture or a video, or an application) to the user. The touch screen 190 transmits an analog signal corresponding to one or more touches input through the GUIs to the touch screen controller 195. The touch screen 190 may receive one or more touches through a finger of the user or the input unit 167.

In an embodiment of the present invention, a touch is not limited to a contact of a body of the user or a touchable input unit 167 with the touch screen 190, and may include hovering in which a detectable interval between the touch screen 190 and the finger of the user or the input unit 167 is 30 mm or less. The non-contact interval detectable by the touch screen 190 may be changed according to a performance or structure of the portable apparatus 100.

The touch screen 190 may be realized, for example, by a resistive touch screen, a capacitive touch screen, an infrared touch screen, or an acoustic wave touch screen. The touch screen 190 will be described in greater detail below with reference to FIG. 4.

According to an embodiment of the present invention, the touch screen 190 may output visual feedback corresponding to a copy command of the input unit 167 under the control of the controller. The touch screen 190 may output haptic feedback corresponding to a paste command of the input unit 167 under the control of the controller.

The touch screen controller 195 may convert an analog signal corresponding to one or more touches received by the touch screen 190 into a digital signal (for example, the X and Y coordinates corresponding to the touch location) to transmit the digital signal to the controller. The controller 110 may calculate the X and Y coordinates corresponding to the touch location on the touch screen by using a digital signal received from the touch screen controller 195. The controller 110 may control the touch screen 190 by using a digital signal received from the touch screen controller 195. The controller 110 may execute an application corresponding to a displayed or selected shortcut icon in response to the input touch.

According to an embodiment of the present invention, one touch screen controller 195 may control the touch screen 190. The touch screen controller 195 may be included in the controller 110 based on a performance or structure of the portable apparatus 100. The touch screen controller 195 is described in greater detail below with reference to FIG. 4.

At least one of the elements shown in the portable apparatus 100 of FIG. 1 may be added or deleted based on a performance of the portable apparatus 100. It will be understood by those skilled in the art that locations of the elements can be changed based on a performance or structure of the portable apparatus 100.

FIG. 2 is a diagram illustrating a front perspective view of the portable apparatus, according to an embodiment of the present invention.

FIG. 3 is a diagram illustrating a rear perspective view of the portable apparatus, according to an embodiment of the present invention.

Referring to FIGS. 2 and 3, the touch screen 190 is located at a central portion of the front surface 100a of the portable apparatus 100. FIG. 2 shows an example of a home screen on the touch screen 190 when the user logs into the portable apparatus 100. The portable apparatus 100 may have a plurality of different home screens. Shortcut icons 191a, 191b, and 191c for executing frequently used applications, a menu switching key 191d displaying a menu screen, a time, and the weather are displayed on the home screen 191. A status bar 192 for displaying a state of the portable apparatus 100, such as, for example, a battery charging status, an intensity of a received signal, and a current time, are displayed at an upper end of the home screen 191. The status bar 192 may not be displayed on the home screen 191 of the portable apparatus 100 according to an Operating System (OS).

The home button 161a, the menu button 161b, and the back button 161c are located at a lower portion of the front surface 100a of the portable apparatus 100. The buttons 161 may be realized by a touch button instead of a physical button. The buttons 161 may be displayed on the touch screen 190.

The first camera 151, the proximity sensor 171, and the luminance sensor 172 are located at an upper portion of the front surface 100a of the portable apparatus 100. The second camera 152, the flash 153, and the speaker 163 are located on the rear surface 100c of the portable terminal 100.

For example, the power/lock button 161d, the volume button 161e, and the one or more microphones 162 are located on the lateral surface 100b of the portable apparatus 100.

The connector 165 is formed on the lateral surface 100b of a lower end of the portable apparatus 100. The connector 165 may have a plurality of electrodes and may be wiredly connected to an external apparatus. The input unit 167 is located on the lateral surface 100b of a lower end of the portable apparatus 100. The input unit 167 may be inserted into and kept in the portable apparatus 100, and may be extracted from the portable apparatus 100 during use thereof.

Figure 4:
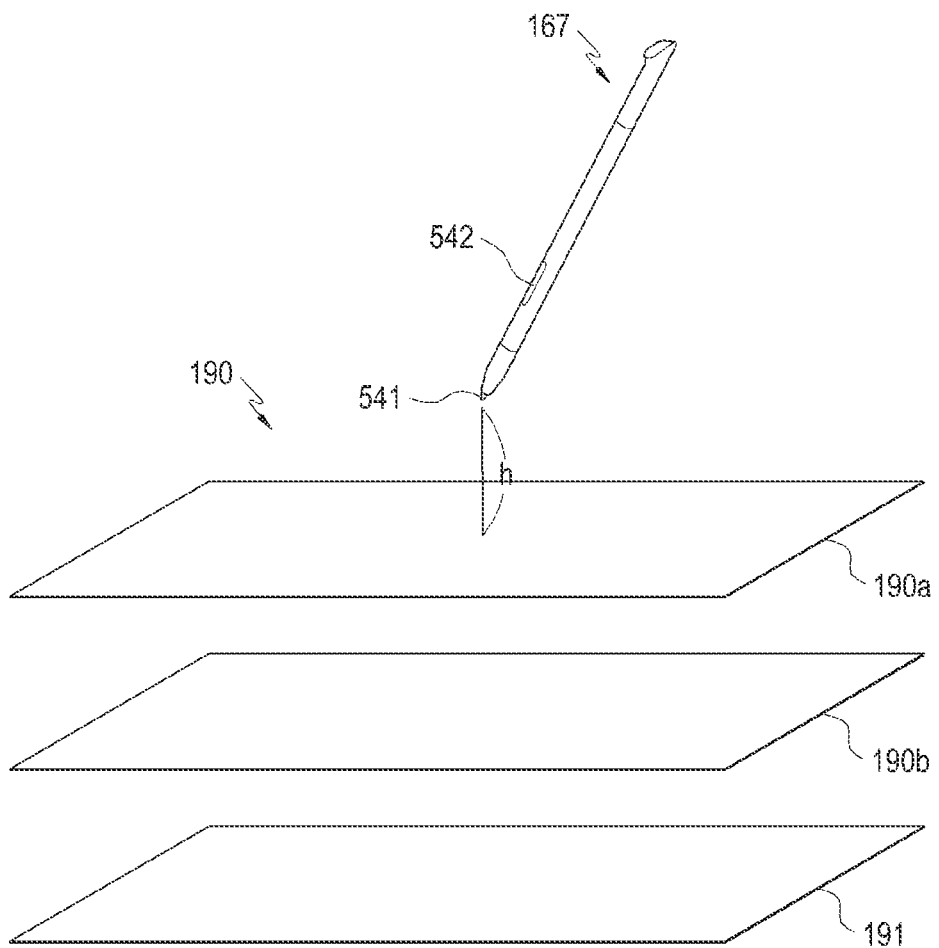
FIG. 4 is a diagram illustrating a sectional view of an interior of a touch screen, according to an embodiment of the present invention.

FIG. 4 is a diagram illustrating a sectional view of an interior of a touch screen, according to an embodiment of the present invention.

Referring to FIG. 4, the touch screen 190 is configured such that a first touch panel 190a for detecting a touch input of a finger or the input unit 167, a display panel 190b for displaying a screen, and a second touch panel 191 for detecting an input of the input unit 167, are sequentially stacked. According to an embodiment of the present invention, the first touch panel 190a of the touch screen 190 may be located below the display panel 190b.

The first touch panel 190a is a capacitive touch panel, and is obtained by coating a thin metallic conductive material (for example, an Indium Tin Oxide (ITO) film) on opposite surfaces of glass, such that a current flows along surfaces of the glass, and coated with a dielectric material capable of storing electric charges. When a finger of the user or the input unit 167 touches a surface of the first touch panel 190a, a predetermined amount of electric charges are moved by static electricity, and the first touch panel 190a recognizes a change in a current due to movement of electric charges to detect a touch location.

The display panel 190b includes a plurality of pixels, and displays an image through the pixels. For example, the display panel 190b may be embodied as an LCD), an Organic Light Emitting Diode (OLED), or an LED. The display panel 190b displays various images and a plurality of objects according to various operation states of the portable apparatus 100, and execution of applications and services.

The second touch panel 191 is an Electronic Magnetic Resonance (EMR) type touch panel, and includes an electronic inductive coil sensor having a grid structure, such that a plurality of loop coils are disposed in a first direction and a second direction crossing the first direction, and includes an electronic signal processing part for sequentially providing an AC signal having a predetermined frequency to the loop coils of the electronic inductive coil sensor. When the input unit 167, having a resonance circuit therein, is located adjacent to a loop coil of the second touch panel 191, the electric field generated from the loop coil generates a current based on electromagnetic induction in a resonance circuit of the input unit 167. An inductive magnetic field is generated in a coil 530 constituting a resonance circuit in the input unit 167, and the second touch panel 191 detects an inductive magnetic field from the loop coil in a signal receiving state to detect a hovering location and a touch location of the input unit 167. The portable terminal 100 may detect a hovering height h, between the display panel 100 to a pen tip 541 of the input unit 167.

It will be understood by those skilled in the art that the hovering height h can be changed to correspond to a performance or structure of the portable terminal 100.

The second touch panel 191 may be dedicatedly used for detection of hovering or a touch by the input unit 167. The input unit 167 may be referred to as an electromagnetic pen or an EMR pen. The input unit 167 may be different from a general pen which does not have a resonance circuit detected by the first touch panel 190*a*. The input unit 167 may include a button 542 for changing an electromagnetic induction value generated by the coil 530 located in an area adjacent to the pen tip 541. The input unit 167 is described in greater detail below with reference to FIG. 5.

The touch screen controller 195 may include a first touch panel controller corresponding to the first touch panel 190*a*, and a second touch panel controller corresponding to the second touch panel 191. The first touch panel controller converts an analog signal received by detection of a touch of a finger or the input unit 167 from the first touch panel 190*a* into a digital signal (for example, X and Y coordinates) to transmit the digital signal to the controller. The second touch panel controller (not shown) converts an analog signal received by detection of hovering or a touch of the input unit 167 from the second touch panel 191 into a digital signal (for example, X, Y, and Z coordinates) to transmit the digital signal to the controller.

The controller 110 may control the first touch panel 190*a*, the display panel 190*b*, and the second touch panel 191 by using the digital signals received from the first touch panel controller and the second touch panel controller. The controller 110 may display a screen on the display panel 190*b* in response to a touch or hovering of a finger or the input unit 167. One touch screen controller 195 may control the first touch panel 190*a* and the second touch panel 191.

In an embodiment of the present invention, the term "touch screen controller" includes the touch screen controller 195, the first touch screen controller, and/or the second touch controller.

Thus, the controller 110 of the portable apparatus 100, according to an embodiment of the present invention, may distinguish and detect a touch and/or hovering by a finger of the user or the input unit 167. Although FIG. 4 shows only one touch screen, the portable apparatus 100, according to an embodiment of the present invention, may include a plurality of touch screens instead of one touch screen. The touch screens may be located in a housing and may be connected to each other by a hinge, or a plurality of touch screens may be located in one flexible housing. As shown in FIG. 4, the plurality of touch screens may include a display panel and at least one touch panel, respectively.

Figure 5:
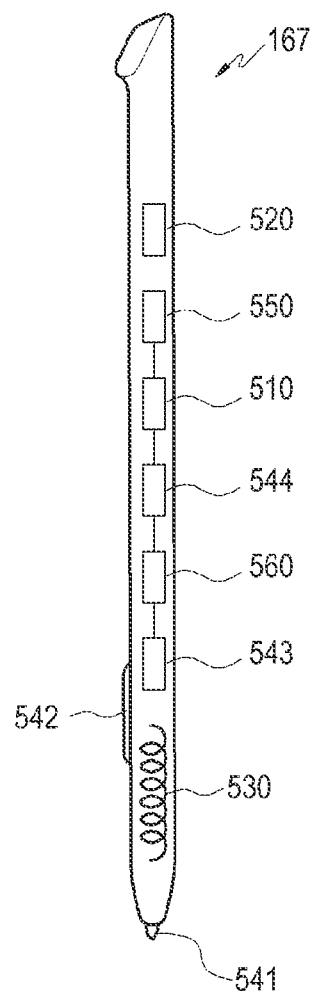
FIG. 5 is a block diagram illustrating an input unit, according to an embodiment of the present invention.

FIG. 5 is a diagram illustrating an input unit, according to an embodiment of the present invention.

Referring to FIG. 5, the input unit 167 may be connected to the portable apparatus 100, another portable apparatus, a mobile phone, a smart phone, a tablet PC, or an external server by using a pen communication unit 520.

The input unit 167 may include a pen controller 510, the pen communication unit 520, a coil 530, the pen felt-tip 541, a pen button 542, a pen speaker 543, the pen vibrating element 544, a pen memory 550, and a pen battery 560.

The pen controller 510 may control the pen communication unit 520, the coil 530, the pen felt-tip 541, the pen button 542, the pen speaker 543, the pen vibrating element 544, the pen memory 550, and the pen battery 560. The pen controller 510 may perform a function of controlling an overall operation of the input unit 167 and a signal flow between the internal elements 520 to 560 of the input unit 167, and a function of processing data. When the pen felt-tip 541 is situated at a location where a contact or hovering can be detected on the touch screen 190 (20 mm or less above the touch screen 190), the pen controller 510 may analyze first and/or second control signals received from the portable apparatus 100 through the pen communication unit 520, and control a vibration period and a vibration intensity of the pen vibrating element 544 included in the input unit 167 based on the first and/or second control signals. The pen controller 510 may control a supply of electric power from the pen battery 560 to the internal elements 520 to 550.

According to an embodiment of the present invention, when the button 542 is pressed by the user after at least one object displayed on the portable apparatus 100 is selected by a touch or hovering of the input unit 167, the pen controller 510 may perform a control to transmit a copy command for copying the object to a copy target through the pen communication unit 520. The pen controller 510 may perform a control to receive some of copy information corresponding to the copy command from the portable apparatus 100 through the pen communication unit 520. The copy information may include object data corresponding to an object to be copied, a file name, a file size, a file type, a file storage location, and a copy time period. The pen controller 510 may perform a control to receive some of copy information corresponding to the copy command from an external server through the pen communication unit 520. The one or more pen speakers 543 may be located in the housing of the input unit 167.

The pen communication unit 520 may include one of a WLAN unit and a short-range communication unit having a frequency band of 2.4 GHz. The pen communication unit 520 may include both the WLAN unit and the short-range communication unit. The pen communication unit 520 may be connected to the portable apparatus 100 and an external server under the control of the pen controller 510.

According to an embodiment of the present invention, the pen communication unit 520 may be connected to the portable apparatus 100 having the short-range communication unit 132 through pairing under the control of the pen controller 510 to transmit and receive a control signal and data. The pen communication unit 520 may receive a control signal transmitted from the portable apparatus 100 and transfer the control signal to the pen controller 510. The pen communication unit 520 may analyze a control signal received from the portable apparatus 100. Although Bluetooth communication is used as an example of a short-range communication unit in an embodiment of the present invention, it may be replaced by or used together with a short-range communication unit, such as, for example, Zigbee, an Ultra Wide Band (UWB) communication, or an RFID, by which a communication channel can be formed in a short range and a signal can be transmitted and received.

The coil 530 generates an inductive magnetic field through an interaction with a loop coil of the second touch panel 191 of the portable apparatus 100. The portable apparatus 100 may receive an inductive magnetic field generated by the coil 530 and detect a hovering location and a touch location of the input unit 167. The portable terminal 100 may detect a height h from the touch screen 190 to the pen felt-tip 541 of the input unit 167.

When the pen button 542 is pressed by the user, it may change an electromagnetic induction value generated in the coil 530. The pen button 542 may include a physical button or a touch button.

The pen speaker 543 may output various sound sources stored in the pen memory 550 under the control of the controller 510. The pen speaker 543, according to an embodiment of the present invention, may output auditory feedback corresponding to a first control command received from the portable apparatus 100 in response to a copy command generated by the button 542. The pen speaker 543 may output auditory feedback corresponding to a second control command received from the portable apparatus 100 in response to a paste command generated by the button 542. The pen speaker 543 may output a sound corresponding to a vibration period and/or a vibration intensity of the pen vibration element 520. The pen speaker 560 may output a sound corresponding to first and/or second control signals output to the input unit 167 substantially together with the speaker 163 included in the portable apparatus 100 (for example, a time interval of 5 ms or less) or after a predetermined time period (for example, 20 ms).

The pen vibrating element 544 may convert an electrical signal into mechanical vibrations under the control of the pen controller 510.

According to an embodiment of the present invention, the pen vibrating element 544 may be activated based on a first control signal and/or a second control signal received from the portable apparatus 100, and may provide haptic feedback to the user. The pen vibrating element 544 may vibrate the entire input unit 167 or a portion of the input unit 167.

The pen memory 550 may store a signal or data that is input or output to correspond to operations of the pen communication unit 520, the coil 530, the pen button 542, the pen speaker 543, the pen vibrating element 544, and the pen battery 560, under the control of the pen controller 510.

According to an embodiment of the present invention, the pen memory 550 may store device information of the input unit 167. For example, the input information may include a model name, a unique unit ID, a residual size of a memory, existence of object data, a Bluetooth version, or a Bluetooth profile. The pen memory 550 may store one or a plurality of haptic waveforms in which the pen vibrating element 544 vibrates based on first and/or second signals received from the portable apparatus 100.

The pen battery 560 may supply electric power to the elements 510 to 550 of the input unit under the control of the pen controller 510. When the battery level is not sufficient, the pen battery 560 may be recharged wirelessly or through a separate wired cable.

According to an embodiment of the present invention, a control signal is received through the pen communication unit 520 of the input unit 167 under the control of the pen controller 510. The control signal is a signal received from the portable apparatus 100, and may be periodically received by the input unit 167 for a predetermined time period or until a time point when hovering is completed. For example, the control signal includes information for activating a mode of a vibrating element 544 of the input unit 167, information for representing a vibration intensity of the input unit 167, information for deactivating a mode of the vibrating element 544 of the input unit 167, and information for representing a total time for which the pen vibrating element 544 vibrates. The control signal has a size of about 8 bytes, and may be repeatedly transmitted by the portable apparatus 100 according to a predetermined period (for example, 5 ms). For example, the control signal may include information in Table 1.

TABLE 1

| Field | Activation of Vibrating Element | Vibration Intensity | Deactivation of Vibrating Element |
|---|---|---|---|
| Information | 1 | 125 125 131 131 0 | 2 |

As in Table 1, a control signal includes information for activating the pen vibrating element 544 of the input unit 167, information for representing a vibration intensity of the pen vibrating element 544, and information for deactivating the pen vibrating element 544. The control signal may be transmitted to the input unit 167 in units of 5 ms, which is merely an example, and may be variably transmitted according to a period of haptic waveforms. The transmission period and the transmission time period of the control signal is also variable. The transmission time period may be a period until a time point when hovering is completely recognized. It will be easily understood by those skilled in the art that an intensity of the control signal may be changed to correspond to a wireless communication method, a performance, or a structure of the portable apparatus 100 and the input unit 167.

At least one of the elements shown in the input unit 167 of FIG. 5 may be added or deleted to correspond to a performance of the input unit 167. It will be easily understood by those skilled in the art that locations of the elements may be changed to correspond to a performance or structure of the portable apparatus 100.

Figure 6:
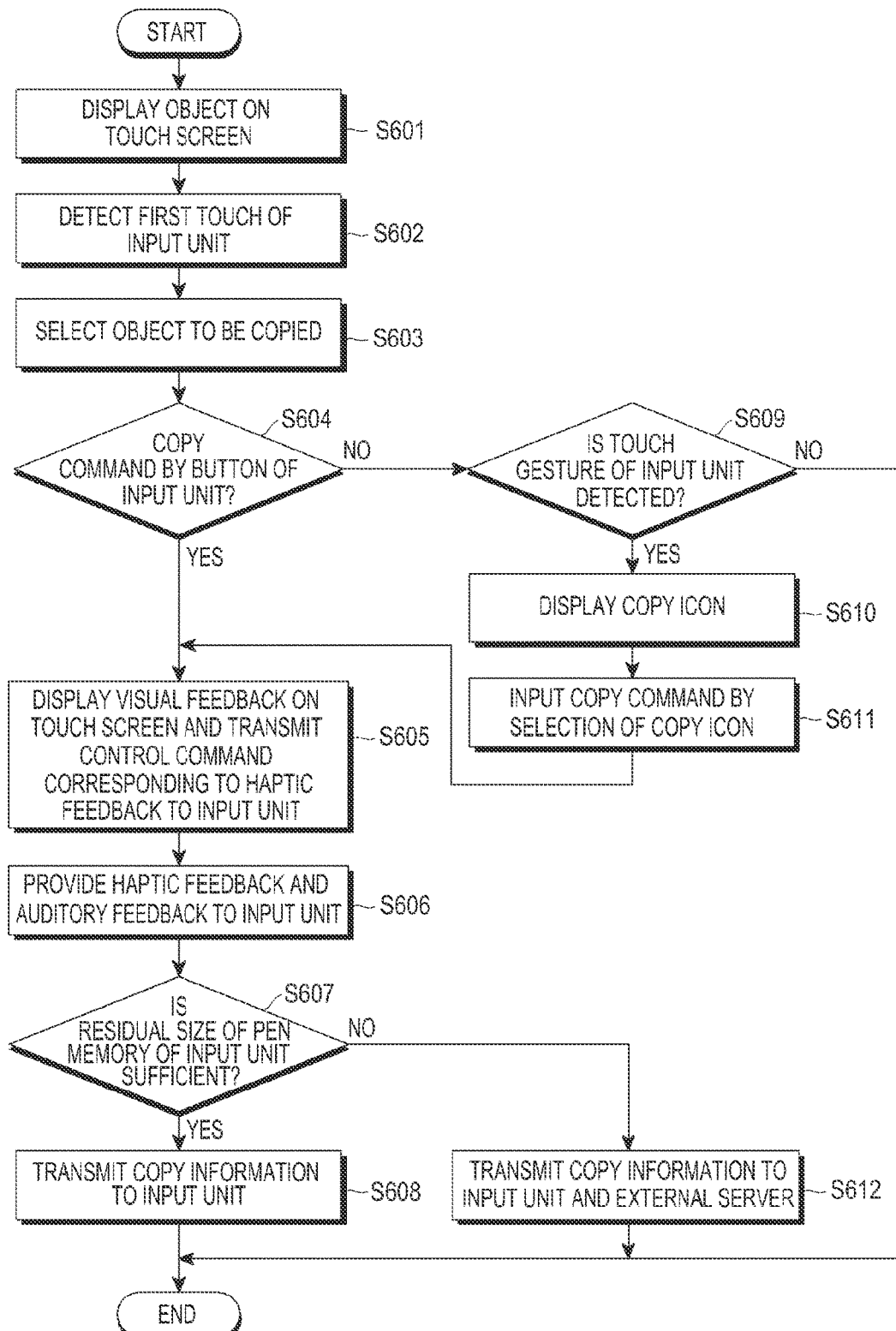
FIG. 6 is a flowchart illustrating a feedback providing method of a portable apparatus, according to an embodiment of the present invention.

FIG. 6 is a flowchart illustrating a feedback providing method of a portable apparatus, according to an embodiment of the present invention.

FIGS. 7A to 7I illustrate feedback providing methods of a portable apparatus, according to various embodiments of the present invention.

Figure 8:
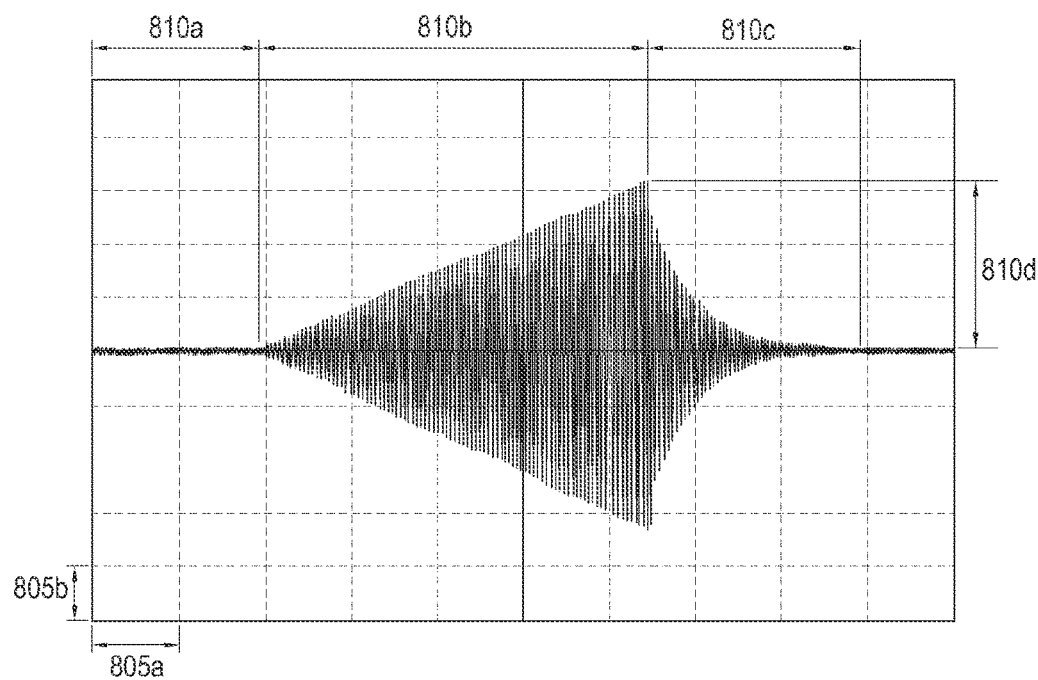
FIG. 8 show an example of haptic waveforms of a portable apparatus, according to an embodiment of the present invention.

FIG. 8 shows an example of haptic waveforms of a portable apparatus, according to an embodiment of the present invention.

In step S601 of FIG. 6, one or more objects are displayed in the touch screen.

Figure 7A:
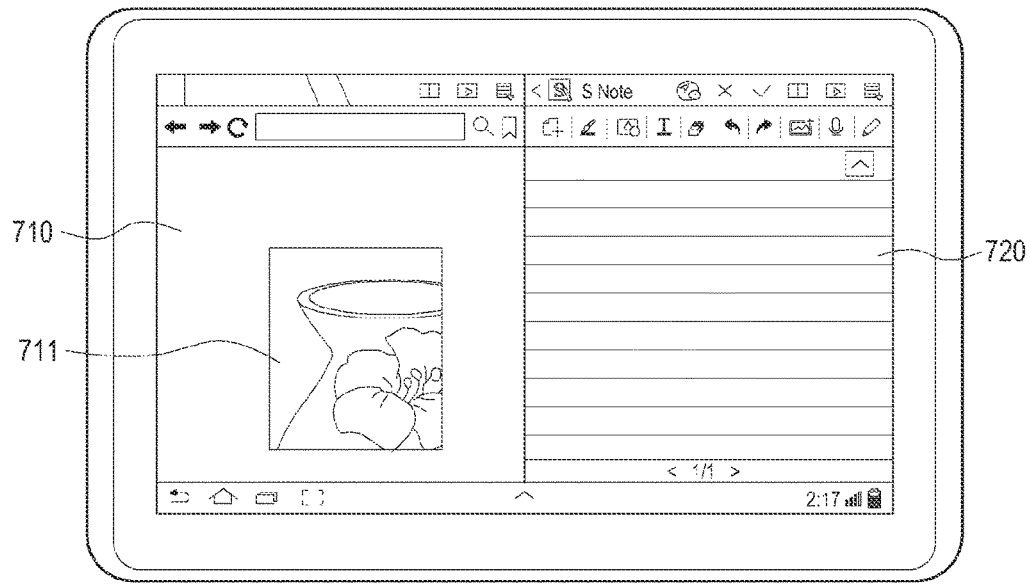
FIGS. 7A to 7I illustrate feedback providing methods of a portable apparatus, according to various embodiments of the present invention.

Referring to FIG. 7A, a plurality of application screens 710 and 720 are displayed on the touch screen 190. An object 711 is displayed on the displayed application screen 710. According to an embodiment of the present invention, the object 711 may be displayed on the touch screen 190 of the portable apparatus 100, and includes at least one of a document, a widget, a picture, a map, a video, an e-mail, an SMS message, and an MMS message, and may be executed, deleted, cancelled, stored, and changed by the input unit 167. The object may be implemented as a shortcut icon, a thumbnail image, or a folder storing at least one object in the portable apparatus. For example, the application screen 710 is a web browser screen, and the application screen 720 is a note application screen. Further, the executed application screen 710 may be displayed in FIG. 7A. In addition, while a plurality of applications are executed, the application screen 710 may be displayed and the application screen 720 may not be displayed.

An example of an application screen displayed on the touch screen 190 will be easily understood by those skilled in the art.

The controller 110 may discover the input unit 167, which can perform a Bluetooth communication, by using a communication unit. The controller 110 may receive device information (for example, a model name, a unique unit ID, a residual size of a memory, a Bluetooth version, or a Bluetooth profile) from the input unit 167 through a communication unit. When being connected to the input unit 167, the controller 110 may perform pairing with the input unit 167 through a communication unit. The controller 110 may perform pairing with the input unit 167 manually (for example, discover the input unit 167 from the portable apparatus 100) or automatically (for example, display a pop-up for registration of an input unit 167 when the input unit 167 is detected from the portable apparatus 100). The controller 110 may receive device information (for example, a model name, a unique unit ID, a residual size of a memory, a Bluetooth version, or a Bluetooth profile) of the input unit 167 through pairing. The controller may receive device information of the input unit 167 after pairing. The received device information is stored in the storage unit of the portable apparatus 100. The controller 110 may perform various embodiments of the present invention by using the device information of the input unit 167. The portable apparatus 100 and the input unit 167 may communicate with a counterpart device through pairing, and share a link key, which is to be used in a verification process, to set a mutually encrypted connection, which means that data can be transmitted mutually.

An example of the device information of the input unit 167 will be easily understood by those skilled in the art.

In step S602 of FIG. 6, a first touch of an input unit is detected.

Figure 7B:
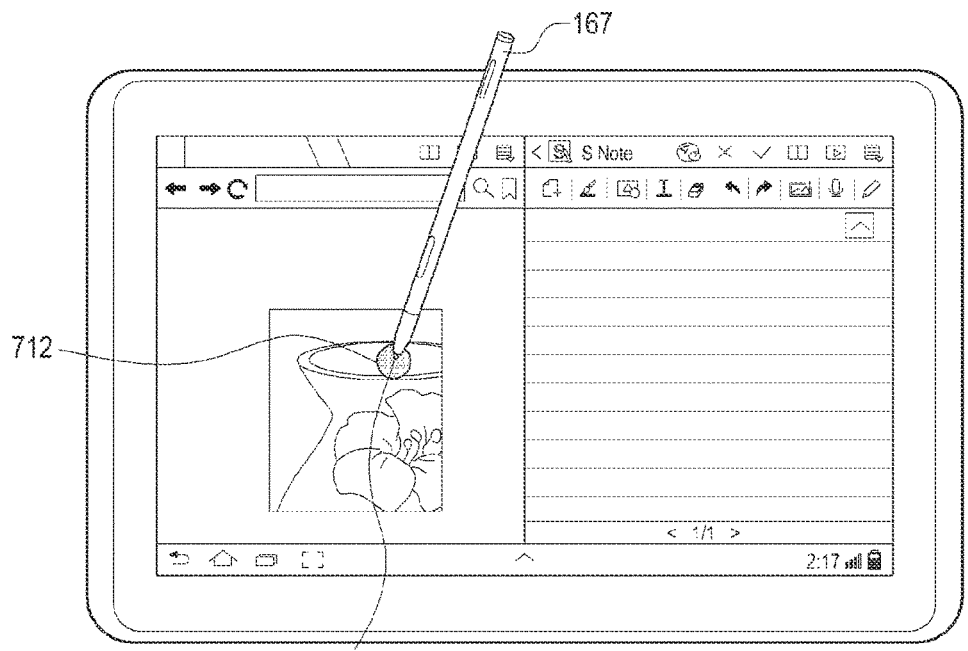

Referring to FIG. 7B, the object 711 displayed on the application screen 710 is touched by the input unit 167. The controller 110 may detect a first touch 712 of the input unit 167 from the application screen 710 through the touch screen 190, the pen recognition panel 191, and the touch screen controller 195. The controller 110 may receive first location information (for example, X1 and Y1 coordinates) corresponding to the first touch 712 from the touch screen controller.

The controller 110 may detect hovering 712a of the input unit 167 from the application screen 710 through the pen recognition panel 191 and the touch screen controller 195. The controller 110 may receive second location information (for example, X2 and Y2 coordinates) corresponding to hovering 712a detected from the touch screen controller.

The controller 110 may store a touch on the touch screen 190 included in the received first location information, a hovering location on the touch screen 190 included in the second location information, a touch detection time, and touch information (for example, a touch pressure or a hovering height) corresponding to the touch in the storage.

It will be easily understood by those skilled in the art that the number of detected touches may be changed to correspond to a performance or structure of the portable apparatus 100.

In step S603 of FIG. 6, an object to be copied is selected.

Figure 7C:
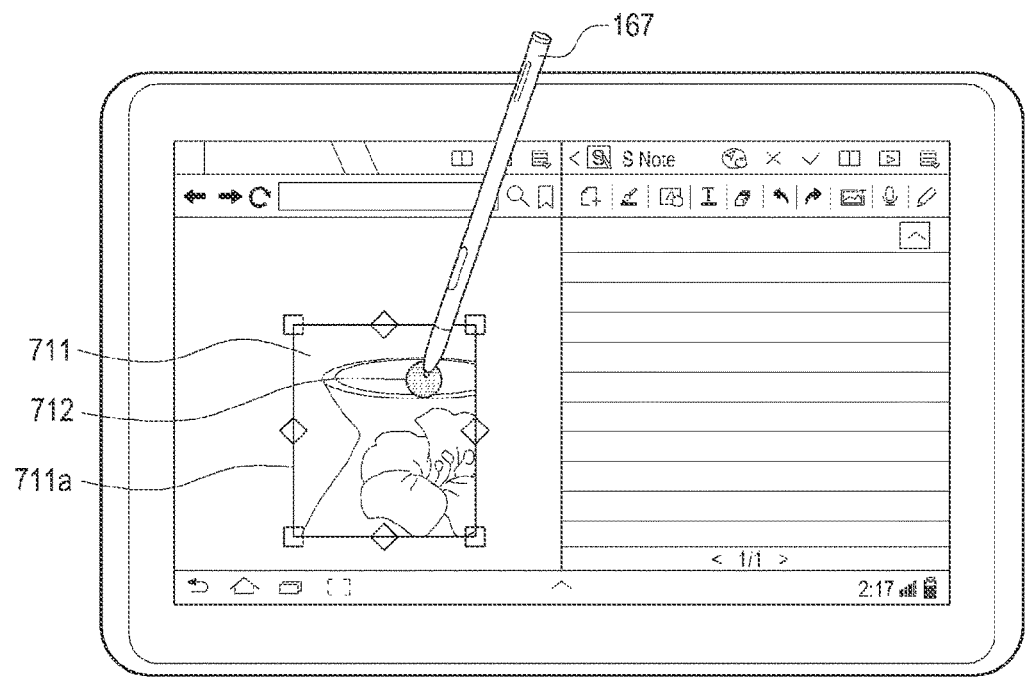

Referring to FIG. 7C, the controller 110 may select the object 711 corresponding to the touch 712 of the input unit 167. The controller may select the object 711 corresponding to hovering 712a of the input unit 167. For example, the object 711 may be selected by displaying a periphery 711a of the object 711, displaying a separate symbol (for example, □, ◊, and ○) at the periphery 711a of the object 711, or displaying the object 711 in different colors. The controller 110 may select the object 711 by using first location information (X1 and Y1 coordinates) corresponding to the touch 712 of the input unit 167 received from the touch screen controller 195 or second location information (X2 and Y2 coordinates) corresponding to hovering 712a. The controller 110 maps object information (for example, a file name, a file size, a file type, a file extension, or a file storage location) corresponding to the selected object 711 with device information of the input unit 167 stored in advance, to store the mapping result in a temporary storage space in the application 710 or a clip board. The controller 110 may provide at least one of visual feedback (for example, a flash and a video) through the touch screen 190, auditory feedback (for example, output of a sound) using the speaker 163, and haptic feedback (for example, output of vibrations) using the vibration motor 164 to correspond to selection of the object 711.

The controller 110 may perform a control to transmit a first control signal corresponding to haptic feedback (for example, output of vibrations) to be output from the pen vibrating element 544 through a communication unit, in response to device information of the input unit 167 and selection of the object 711, to the input unit 167 in a Bluetooth Serial Port Profile (SSP). The input unit 167 may output haptic feedback (for example, output of vibrations) from the pen vibrating element 544 based on a first control signal received from the portable apparatus 100.

The controller 110 may perform a control to transmit a first control signal corresponding to auditory feedback (for example, output of a sound) to be output from the pen speaker 543, in response to device information of the input unit 167 stored in advance and selection of the object 711, to the input unit 167 in a Bluetooth Serial Port Profile (SSP), separately from the first control signal corresponding to haptic feedback, through a communication unit. The input unit 167 may output auditory feedback (for example, output of a sound) from the pen speaker 543 based on the first control signal received from the portable apparatus 100. The pen controller 510 may provide one of haptic feedback and auditory feedback, or a combination of haptic feedback and auditory feedback.

The controller 110 may perform a control to transmit one of a first control signal, where haptic, auditory, or visual feedback provided by the portable apparatus 100 is the same as haptic, auditory, or visual feedback provided by the input unit 167, and another control signal through a communication unit.

In step S604 of FIG. 6, it is determined whether a copy command, input via a button of the input unit, is received.

Figure 7D:
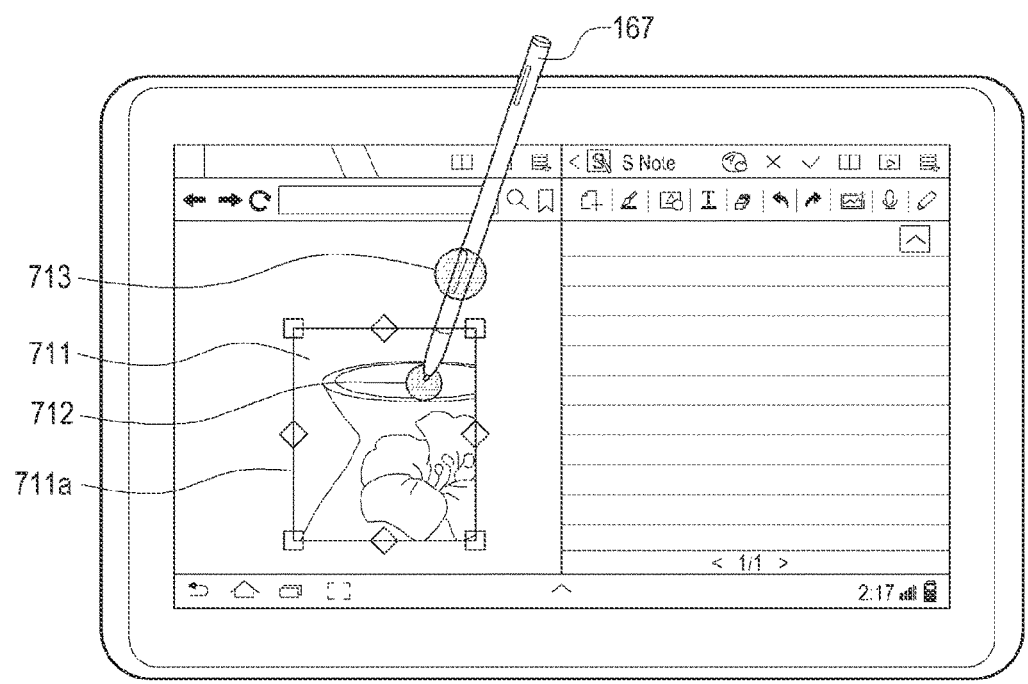

Referring to FIG. 7D, the controller 110 may receive a copy command for the selected object 711 from the input unit 167 in a Bluetooth Serial Port Profile (SPP). The controller maps the received copy command with the device information of the input unit 167 stored in advance and stores the mapping result in the storage.

When the button 542 is pressed 713 by the user, the pen controller 510 may convert an operation mode of the input unit 167 into a copy mode. If an input of touching the button 542 is generated by the user when the button 542 is of a touch type, the pen controller 510 may convert an operation mode of the input unit 167 into a copy mode. The pen controller 510 may perform a control to transmit a copy command to the portable apparatus 100 through the pen communication unit 520. The copy command may be transmitted periodically (for example, every 50 ms) for a predetermined time period (for example, 5 s) through the pen communication unit 520 under the control of the pen controller 510. The predetermined time may be variably regulated. When the button 542 is pressed once more by the user, the pen controller 510 may release the copy mode, which is a current operation mode of the input unit 167. When the button 542 of the input unit 167 that is hovering is pressed 713 by the user, the pen controller 510 may convert an operation mode of the input unit 167 into a copy mode. The pen controller 510 may perform a control to transmit a copy command to the portable apparatus 100 through the pen communication unit 520 in the Bluetooth Serial Port Profile (SPP). The copy command may be transmitted periodically (for example, every 50 ms) for a predetermined time (for example, 5 s) through the pen communication unit 520 under the control of the pen controller 510. When the button 542 is pressed 713 once more by the user, the pen controller 510 may release the copy mode, which is a current operation mode of the input unit 167.

When a copy command, input via a button of the input unit 167, is received, a visual feedback is displayed on the touch screen and a control command corresponding to haptic feedback is transmitted to the input unit 167, in step S605 of FIG. 6.

Figure 7E:
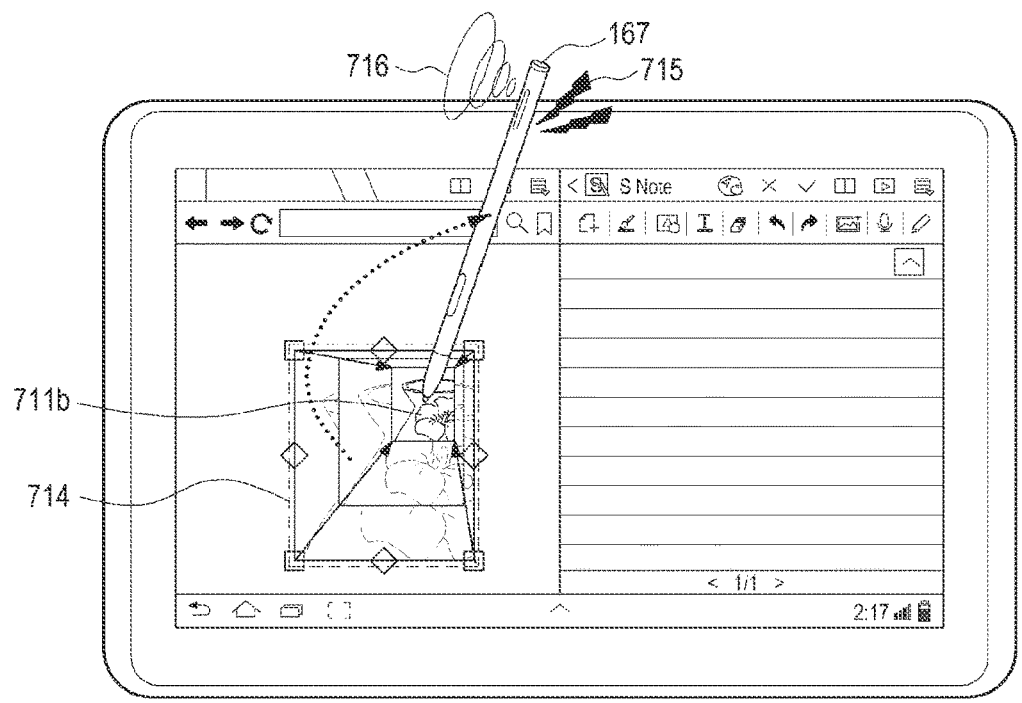
Figure 7F:
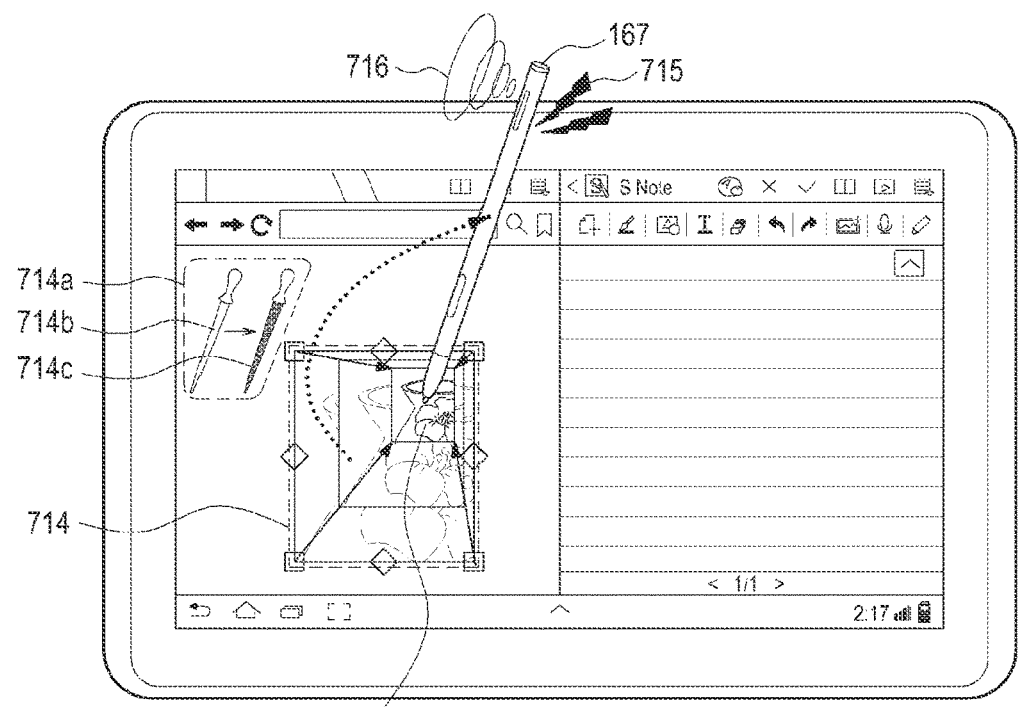
Figure 7G:
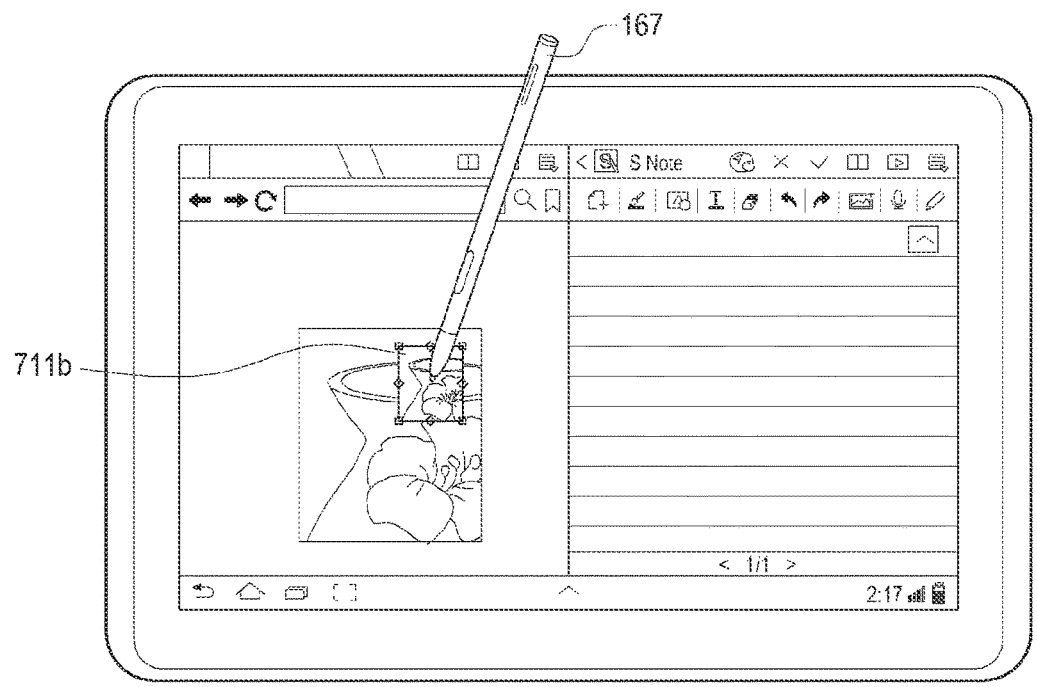

Referring to FIGS. 7E and 7G, the controller 110 may perform a control to display visual feedback 714 by which the object 711 is reduced from a current size (for example, 200 pixels×240 pixels) to a predetermined size 711b (for example, 50 pixels×50 pixels, which is 25% of the original size) in response to the received copy command. The visual feedback 714 is gradually reduces the current size of the object 711 to the predetermined size 711b. The visual feedback 714 may reduce the object 711 to a predetermined size 711b with reference to a central location of the current size of the object 711. When the visual feedback 714 completely reduces the object 711 to the predetermined size 711b and the input unit 167 becomes more distant from the touch screen 190 than a height where hovering of the input unit 167 is detected, the controller may not display the reduced object 711b. When the input unit 167 is closer to the touch screen 190 than a height where hovering of the input unit is detected, the controller may display the reduced object 711b.

The controller 110 may perform a control to transmit a first control signal to the input unit 167 in a Bluetooth Serial Port Profile (SPP) by using device information of the input unit 167 stored in advance, in response to the received copy command. The first control signal may include haptic information on haptic feedback 715 to be output through the pen vibrating element 544. For example, Table 1 is an example of haptic information. The first control signal may include auditory information on auditory feedback 716 to be output through the pen speaker 543. The auditory information may include a sound source to be output through the pen speaker 543. The input unit 167 may store haptic information corresponding to the haptic feedback and auditory information corresponding to the auditory feedback in the pen memory 550 in advance. The control information may include a file name, a file type, the pen speaker 543 activation information, sound intensity information, and the pen speaker 543 deactivation information corresponding to a sound source stored in the pen memory 550.

The controller may simultaneously perform transmission of a first control signal to the input unit 167 and displaying of visual feedback, or may perform one of transmission of the first control signal and displaying of the visual feedback first.

According to an embodiment of the present invention, additional visual feedback 714a using a new object 714b, as well as visual feedback of the object 711, may be selectively provided. Referring to FIG. 7F, when the visual feedback 714 is displayed, the new object 714b is displayed adjacent to (for example, 20 mm or less) the object 711. The new object 714b is an empty pipette that has not suctioned a liquid. The controller may display the pipette 714b, which gradually suctions a liquid in response to the visual feedback 714 by which the size of the object 711 is gradually reduced to a predetermined size. When the object 711 is completely reduced to a predetermined size 711b, the controller 110 may display a pipette 714c that has completely suctioned a liquid. The controller 110 may display the pipette 714c that has completely suctioned a liquid for a predetermined time period (for example, 500 ms).

The controller 110 may perform a control to output haptic feedback through the vibration motor 164 as well as through visual feedback in response to the received copy command. The controller 110 may vibrate the vibration motor 164 to correspond to haptic information as shown in FIG. 8 to provide haptic feedback. FIG. 8 is described in greater detail below with respect to step S606 of FIG. 6. The controller 110 may perform a control to output a sound source corresponding to auditory feedback through the speaker 163, as well as visual feedback, in response to the received copy command.

In step S606 of FIG. 6, the input unit 167 provides haptic feedback and auditory feedback.

Referring to FIGS. 7E and 8, the pen controller 510 may receive a control command in a Bluetooth Serial Port Profile (SPP) through the pen communication unit 520. The pen controller 510 may control such that the pen vibrating element 544 outputs (for example, FIG. 8) haptic feedback, corresponding to haptic information included in control information, in response to the received control command.

The transverse axis (X axis) of FIG. 8 represents a vibration time period of the pen vibrating element 544, in units of 50 ms 805a. The longitudinal axis (Y axis) represents a vibration intensity of the pen vibrating element 544, in units of 500 mV 805b. As shown, the haptic waveform corresponding to the haptic information of FIG. 8 gradually increases from 0 V to 1.6 V and rapidly decreases to 0V in the vibration.

In a preprocessing section 810a, the pen controller 510 may analyze and/or store control information received by the portable apparatus 100 and supply electric power to the pen vibrating element 544. For example, the preprocessing section 810a may refer to a section before vibrations are generated in the pen vibrating element 544.

An acceleration section 810b is a section in which a vibration time period and a vibration intensity of the pen vibrating element 544 increase. A maximum intensity 810d of the acceleration section 810b may be changed according to a file size and a copy processing time period included in the copy information. For example, the maximum acceleration section and the maximum intensity of the acceleration section whose file size is 1 MB may be greater than those of the acceleration section whose file size is 500 KB. The copy processing time period and the maximum intensity of the acceleration section whose copy processing time period is 1.5 s may be greater than those of the acceleration section whose copy processing time period is 500 ms.

A deceleration section 810c is a section in which vibrations of the pen vibrating element 544 corresponding to the maximum intensity 810d decelerate. The pen controller 510 may complete the output of haptic feedback in the deceleration section 810c. The time axis of the deceleration section 810c may be shorter than or equal to the time axis (X axis) of the acceleration section 810b. In an embodiment of the present invention, various haptic waveforms (for example, FIGS. 13 to 15), whose vibration time periods, vibration periods, and vibration intensities are different, may be stored in addition to FIG. 8, and another haptic waveform may be generated and stored by using a combination of the haptic waveforms (for example, FIGS. 13 to 15) that are stored in advance.

The pen controller 510 may perform a control to output auditory feedback corresponding to auditory information (for example, a sound source) included in control information from the pen speaker 543 in response to the received control command. The pen controller 510 may perform a control to selectively output one of haptic feedback and auditory feedback.

In step S607 of FIG. 6, it is determined whether a residual size of the memory of the input unit 167 is sufficient.

The controller may compare a residual size of the pen memory 550 of the input unit 167 with a file size included in object information of the object 711, by using device information of the input unit 167 stored in advance.

According to the comparison result, the controller may transmit one of copy information including object data of the object 711 and copy information excluding object data of the object 711 to the input unit 167.

In an embodiment of the present invention, it will be easily understood by those skilled in the art that the residual size of the memory of the input unit may be identified in steps S603 to S605.

When the residual size of the memory of the input unit 167 is not sufficient, copy information is transmitted to the input and the external server, in step S612.

When the residual size of the pen memory 550 is smaller than a file size of the object 711, the controller may perform a control to transmit first copy information without object data of the copy information corresponding to the object 711 to the pen communication unit 520 by using device information of the input unit 167. The controller 110 may perform a control to transmit object data of the copy information to an external server through a URL of an external server of a manufacturer stored in the storage and a communication unit. The controller 110 may map the first copy information with the URL of the external server to store the mapping result. The controller 110 may receive object data transmitted to an external server by using the first copy information transmitted to the input unit 167. The controller 110 may store object data of the copy information in a clip board of the storage. The object data stored in the clip board may be pasted in the portable apparatus 100 by using the first copy information transmitted to the input unit 167.

It will be easily understood by those skilled in the art that in an embodiment of the present invention, a copy command, control information, and copy information are transmitted and received between the portable apparatus 100, the input unit 167, and the external server by using communication units of the portable apparatus 100, the input unit 167, and the external server which support various communication methods and the transmission/reception method is not limited to Bluetooth.

When copy information is completely transmitted to the external server (not shown), the controller may complete outputting of visual, haptic, and auditory feedbacks provided by the portable apparatus 100.

When the residual size of the memory of the input unit 167 is sufficient, copy information is transmitted to the input unit, in step S608.

When the residual size of the pen memory 550 is larger than a file size of the object 711, the controller may perform a control to transmit copy information corresponding to the object 711 to the pen communication unit 520 in a Bluetooth Serial Port Profile (SPP) by using device information of the input unit 167. The copy information may include object data, a file name, a file size, a file type, a file storage location, and a copy time period.

When copy information is completely transmitted to the input unit 167, the controller may output visual, haptic, and auditory feedbacks provided by the portable apparatus 100.

Returning to step S604 of FIG. 6, when a copy command is not input via a button of the input unit 167, it is determined whether a touch gesture of the input unit is detected, in step S609.

When a touch gesture (for example, a rotation, a flick, or a long press) by the input unit 167 is detected from the touch screen 190, the controller may detect a continuous movement (for example, continuous X and Y coordinates corresponding to a movement of the touch gesture) of the touch 712 by using the touch screen 190 and the touch screen controller 195. The controller may store a continuous movement starting from the detected touch 712 in the storage. The continuous movement of the touch 712 means that a contact on the touch screen is continued. For example, a long press may refer not to a continuous movement of a touch but to a touch gesture whose touch maintenance time period is 2 s or more.

When a touch gesture (for example, a rotation, a flick, or a long press) of the input unit 167 which is hovering is input to the touch screen 190, the controller may detect a continuous movement (for example, continuous X and Y coordinates corresponding to a movement of the touch gesture) of the input unit 167 by using the pen recognition panel 191 and the touch screen controller. The controller may store a continuous movement starting from the detected hovering location in the storage.

It will be easily understood by those skilled in the art that a touch gesture may be changed through setting of an environment in step S609 of FIG. 6.

When a touch gesture of the input unit 167 is not detected in step S609 of FIG. 6, the methodology terminates.

When a touch gesture of the input unit 167 is detected, a copy icon is displayed, in step S610.

Figure 7H:
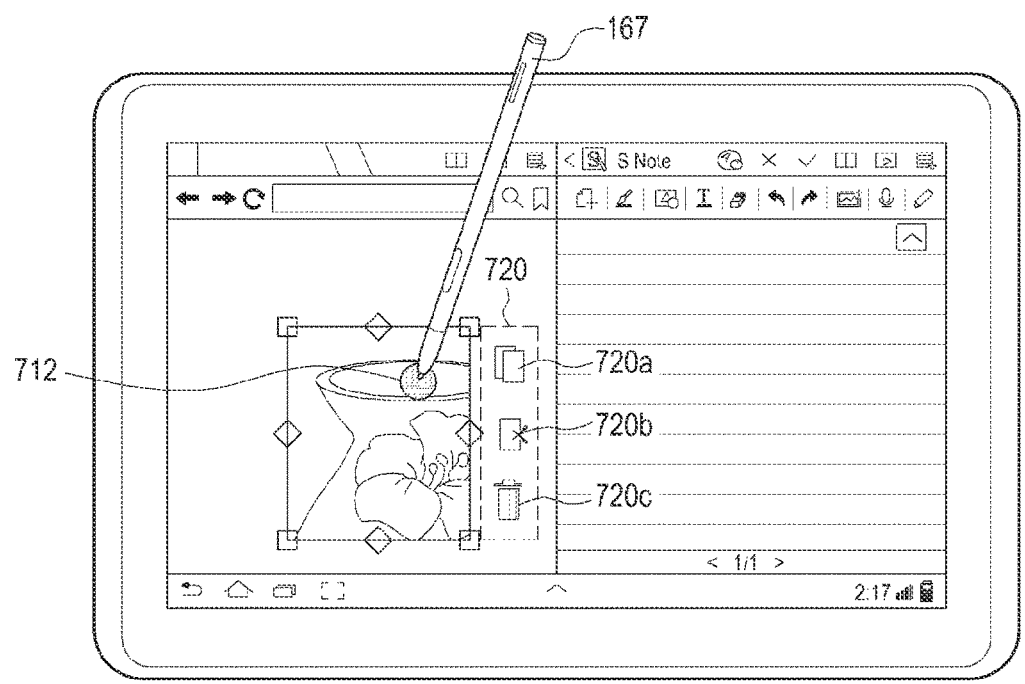

Referring to FIG. 7H, the controller may display an icon group 720 in response to an input touch gesture. The icon group 720 includes a copy icon 720a, a cut icon 720b, and a delete icon 720c. It will be easily understood by those skilled in the art that the icon displayed in the icon group 720 may be added, changed, or deleted to correspond to a performance or structure of the portable apparatus 100.

In step S611 of FIG. 6, a copy command is received by selection of a copy icon.

Figure 7I:
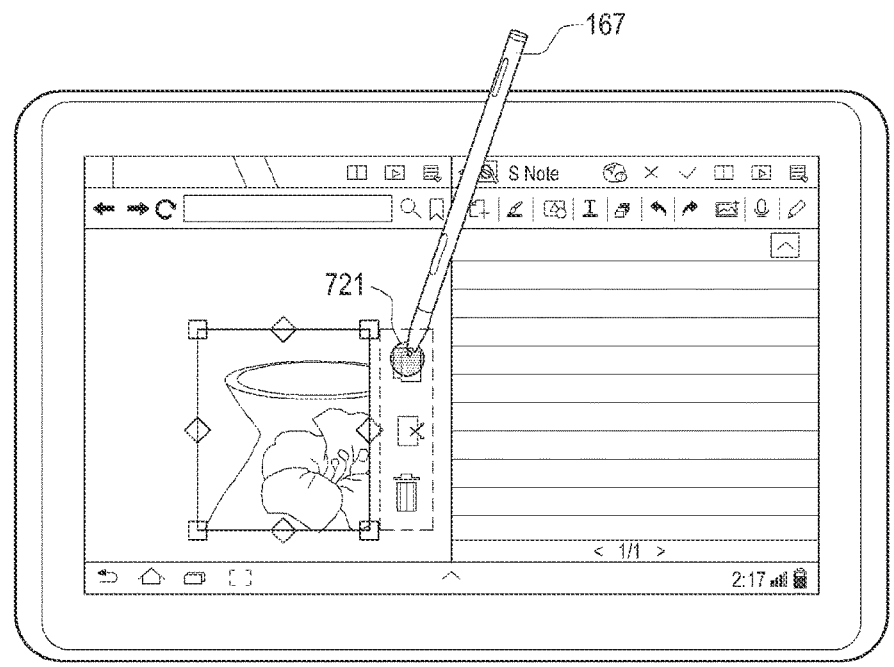

Referring to FIG. 7I, the copy icon 720a is selected 721 from the displayed icon group 720 by the input unit 167. The controller receives a copy command corresponding to the selection 721 of the copy icon 720a by the input unit 167. The controller maps the received copy command with device information of the input unit 167 stored in advance to store the mapping result in the storage. When the copy icon 720a is selected, the controller may perform a control to remove the icon group 720.

The controller may perform a control to transmit a mode conversion signal of the input unit corresponding to the input copy command to the input unit. The pen controller 510 converts an operation mode of the input unit 167 into a copy mode in response to the received mode conversion signal. When the button 542 is pressed by the user, the pen controller 510 may release a copy mode, which is an operation mode of the input unit 167.

When the copy icon 720a is selected by the input unit 167 that is hovering, the controller may perform a control to transmit a mode conversion signal of the input unit corresponding to the input copy command to the input unit. The pen controller 510 converts an operation mode of the input unit 167 into a copy mode in response to the received mode conversion signal. When the button 542 is pressed by the user, the pen controller 510 may release a copy mode, which is an operation mode of the input unit 167.

When a copy command is received via selection of the copy icon 720*a*, the continues at step S605.

Figure 9:
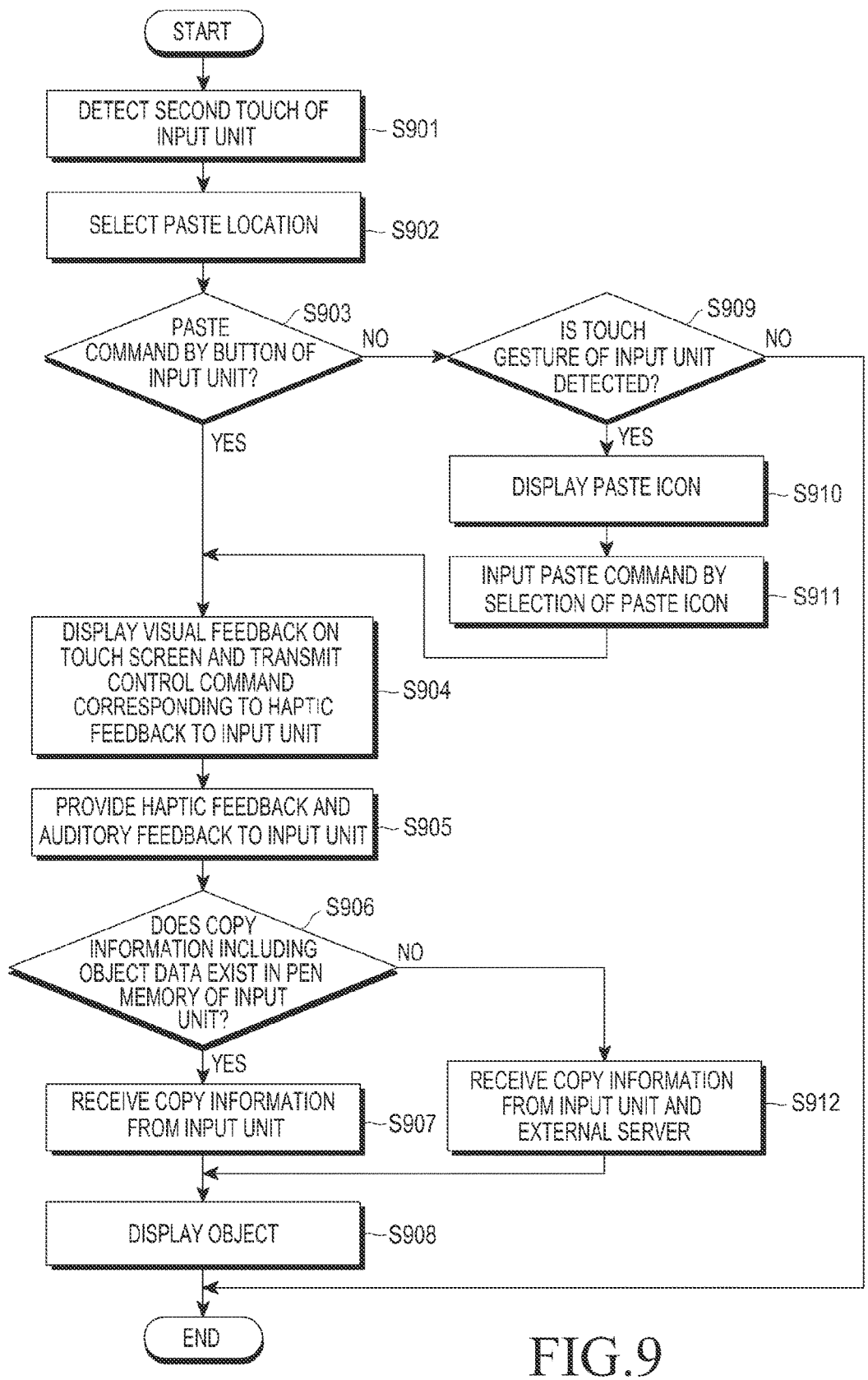
FIG. 9 is a flowchart illustrating a feedback providing method of a portable apparatus, according to an embodiment of the present invention.

FIG. 9 is a flowchart illustrating a feedback providing method of a portable apparatus, according to an embodiment of the present invention.

FIGS. 10A to 10G illustrate feedback providing methods of a portable apparatus, according to various embodiments of the present invention.

Figure 11:
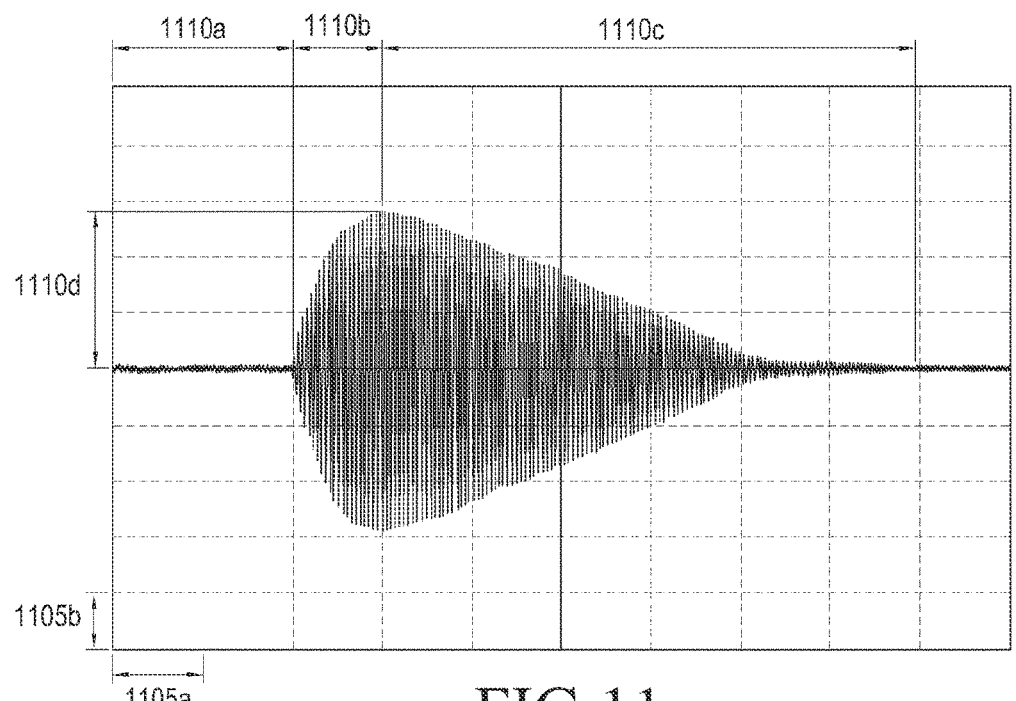
FIG. 11 show an example of haptic waveforms of a portable apparatus, according to an embodiment of the present invention.

FIG. 11 shows an example of haptic waveforms of a portable apparatus, according to an embodiment of the present invention.

In step S901 of FIG. 9, a second touch of the input unit 167 is detected.

Figure 10A:
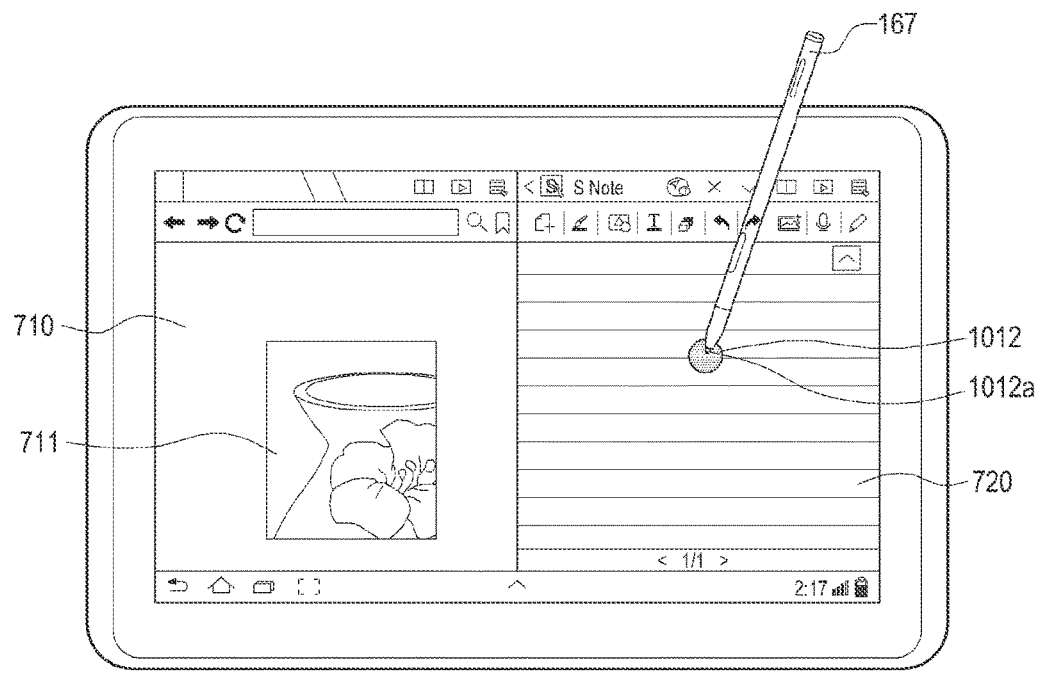
FIGS. 10A to 10G illustrate feedback providing methods of a portable apparatus, according to various embodiments of the present invention.

Referring to FIG. 10A, the note application screen 720 is touched by the input unit 167. The controller 110 may detect a second touch 1012 of the input unit 167 from the note application screen 720 through the touch screen 190, the pen recognition panel 191, and the touch screen controller 195. The controller 110 may receive third location information (for example, X3 and Y3 coordinates) corresponding to the second touch 1012 from the touch screen controller 195.

Hovering 1012*a* of the input unit 167 is detected in the note application screen 720. The controller may detect hovering 1012*a* of the input unit 167 from the note application screen 720 through the pen recognition panel 191 and the touch screen controller. The controller may receive fourth location information (for example, X4 and Y4 coordinates) corresponding to hovering 1012*a* detected from the touch screen controller.

The controller may store touch information (for example, a touch pressure or a hovering height) corresponding to a touch on the touch screen 190 included in the received third location information or a hovering touch, a touch detection time, and a touch on the touch screen 190 included in the fourth location information in the storage. The touch 1012 contacting the touch screen 190 may be generated, for example, by one of fingers or the input unit 167.

It will be easily understood by those skilled in the art that the number of detected touches may be changed to correspond to a performance or structure of the portable apparatus 100.

The controller 110 may receive device information (for example, a model name, a unique unit ID, a residual size of a memory, a Bluetooth version, or a Bluetooth profile) from the input unit 167. The controller 110 may receive copy information (for example, object data, a file name, a file size, a file type, a file storage location, and a copy time period) from the input unit 167. When copy information exists in the input unit 167, the controller 110 may receive copy information from the input unit. The received device information and copy information may be stored in the storage. The controller 110 may perform various examples of the present invention by using the device information of the input unit 167.

In step S902 of FIG. 9, a paste location is selected.

Referring to FIG. 10A, the controller 110 may select a paste location corresponding to the touch 1012 of the input unit 167. The controller 110 may select a paste location corresponding to hovering 1012*a* of the input unit 167. The controller 110 may select a paste location by using third location information (X3 and Y3 coordinates) corresponding to touch 1012 of the input unit 167 received from the touch screen controller 195, and fourth location information (X4 and Y4 coordinates) corresponding to hovering 1012*a*. The controller 110 may map device information of the input unit 167 stored in advance with third location information or fourth location information to store the mapping result in a temporary storage space or clip board in the note application 720. The controller 110 may provide at least one of visual feedback (for example, a flash, and a video) through the touch screen 190, auditory feedback (for example, output of a sound) using the speaker 163, and haptic feedback (for example, output of vibrations) using the vibration motor 164 in correspondence to selection of a paste location.

The controller 110 may perform a control to transmit a second control signal corresponding to haptic feedback (for example, output of vibrations) to be output from the pen vibrating element 544 in a Bluetooth Serial Port Profile (SPP) through a communication unit in response to device information of the input unit 167 stored in advance and selection of a paste location. The input unit 167 may output haptic feedback from the pen vibrating element 544 based on a second control signal received from the portable apparatus 100.

The controller 110 may perform a control to transmit a second control signal corresponding to haptic feedback and a second control signal corresponding to auditory feedback (for example, output of a sound) to be output from the pen speaker 543 in response to device information of the input unit 167 separately stored in advance and selection of a paste location to the input unit in a Bluetooth SPP through a communication unit. The input unit 167 may output auditory feedback (for example, output of a sound) from the pen speaker 543 based on the second control signal received from the portable terminal 100. The pen controller 510 may provide one of haptic feedback and auditory feedback, or provide a combination of haptic feedback and auditory feedback.

The controller may perform a control to transmit a second control signal where haptic, auditory, or visual feedback provided by the portable apparatus 100 is the same as haptic, auditory, or visual feedback provided by the input unit 167, and/or another control signal through a communication unit.

In step S903 of FIG. 9, it is determined whether a paste command is received via a button of the input unit 167.

Figure 10B:
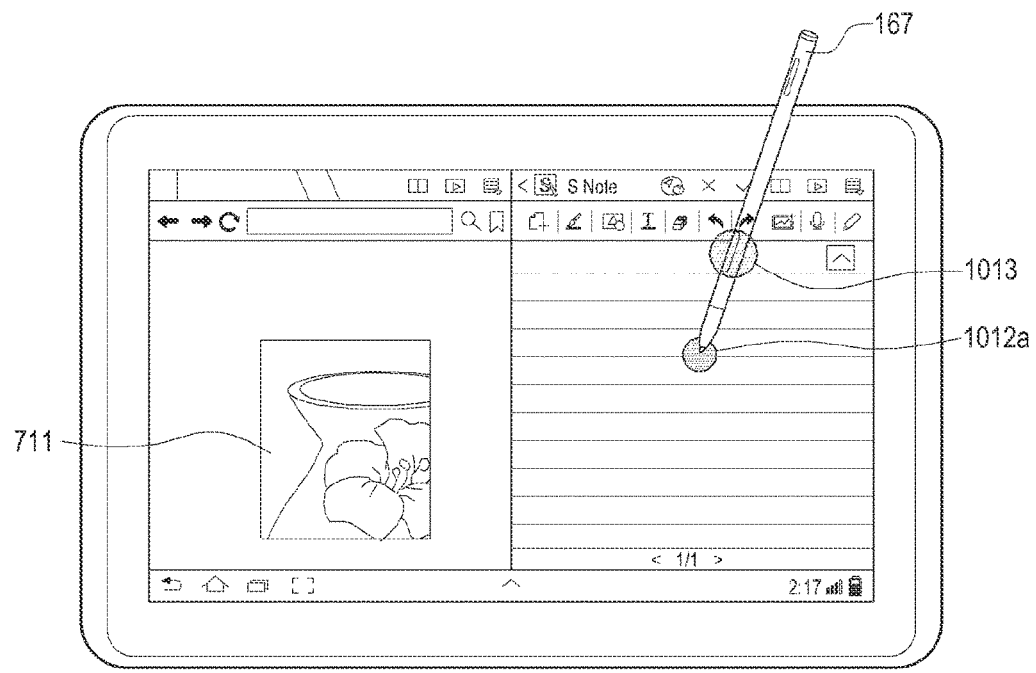

Referring to FIG. 10B, the controller 110 may receive a paste command of the copied object 711 from the input unit 167 in a BluetoothSPP. The controller 110 maps the received paste command with device information of the input unit 167 stored in advance to store the mapping result in the storage. The controller may display an object (711*b* in FIG. 7G) of a predetermined size at a paste location in response to the received paste command.

When the button 542 is pressed 1013 by the user, the pen controller 510 converts an operation mode of the input unit 167 into a paste mode. The pen controller 510 may perform a control to transmit a paste command to the portable apparatus 100 through the pen communication unit 520. The paste command may be transmitted periodically (for example, every 50 ms) for a predetermined time period (for example, 5 s) through the pen communication unit 520 under the control of the pen controller 510. The predetermined time period may be variably regulated. When the button 542 is pressed once more by the user, the pen controller 510 may release a paste mode, which is a current operation mode of the input unit 167. When the button 542 of an input unit 167 that is hovering is pressed 1013 by the user, the pen controller 510 may convert an operation mode of the input unit 167 into a paste mode. If an input is generated by touching the button 542, when the button 542 is of a button type, the pen controller 510 may convert an operation mode of the input unit 167 into a paste mode. The pen controller 510 may perform a control to transmit a paste command to the portable apparatus 100 in a Bluetooth SPP through the pen communication unit 520. The paste command may be transmitted periodically (for example, every 50 ms) for a predetermined time period (for example, 5 s) through the pen communication unit 520 under the control of the pen controller 510. When the button 542 is pressed once more by the user, the pen controller 510 may release the paste mode, which is a current operation mode of the input unit 167.

When it is determined that a paste command is received in step S903 of FIG. 9, visual feedback is displayed on the touch screen and a control command corresponding to haptic feedback is transmitted to the input unit, in step S904.

Figure 10C:
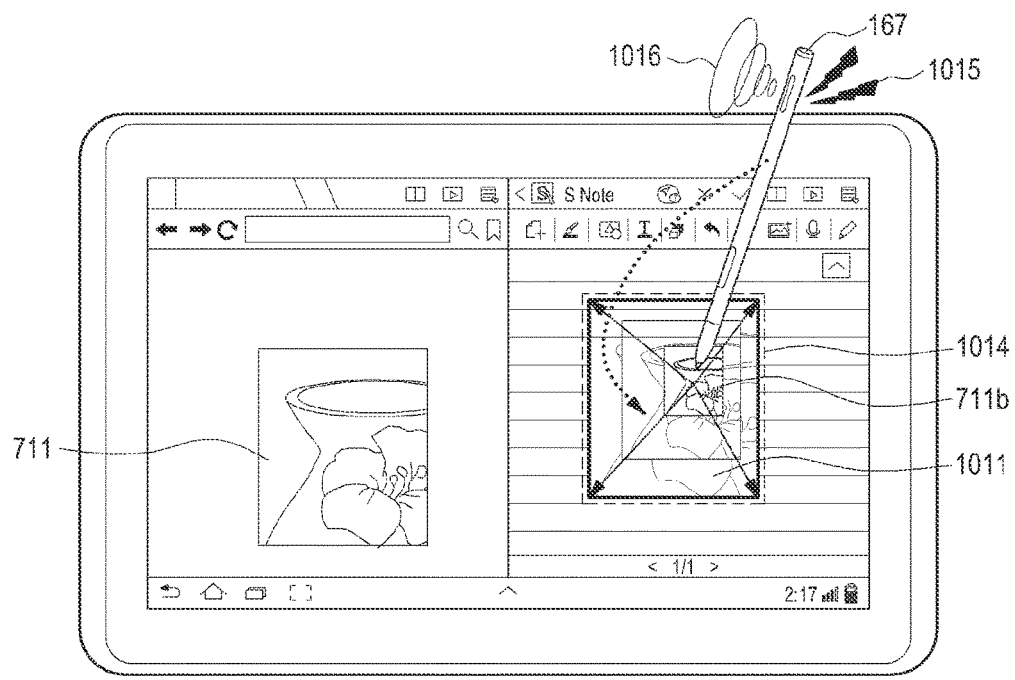
Figure 10D:
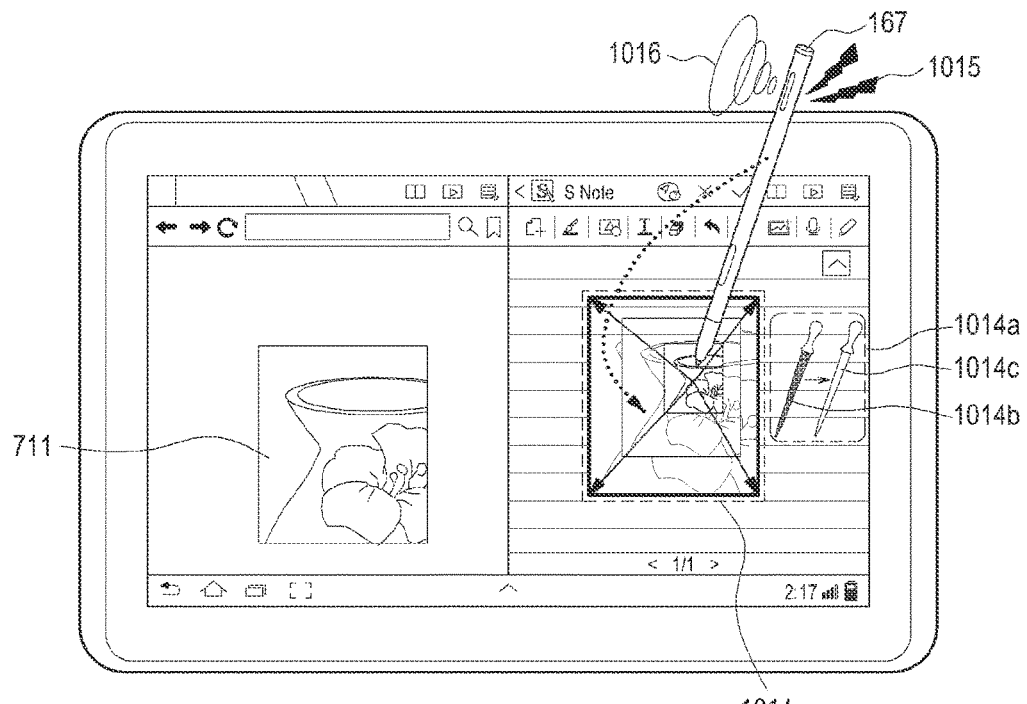

Referring to FIGS. 10C and 10D, the controller displays visual feedback 1014 for expanding the object 711*b* of a predetermined size to an object 1011 in response to the received paste command. The visual feedback 1014 expands the object 1011 to an original size (for example, 200 pixels×240 pixels) with reference to a third touch location. The visual feedback 1014 gradually expands from the predetermined size 711*b* of the object to an original size of the object 1011 at a constant rate. Further, the visual feedback 1014 expands the object with reference to a central location of the paste location.

The controller 110 may perform a control to transmit a second control signal to the input unit 167 in a Bluetooth SPP by using device information of the input unit 167 stored in advance in response to the received paste instruction. The second control signal may include haptic information on haptic feedback 1015 to be output through the pen vibrating element 544. The second control signal may include auditory information on auditory feedback 1016 to be output through the pen speaker 543. The auditory information may include a sound source output through the pen speaker 543. The input unit 167 may store auditory information corresponding to haptic information corresponding to haptic feedback, and auditory information corresponding to auditory feedback in the pen memory 550 in advance. The control information may include a file name, a file type, pen speaker activation information, sound intensity information, and pen speaker deactivation information corresponding to a sound source stored in the pen memory 550.

The controller may simultaneously perform transmission of a second control signal to the input unit 167 and displaying of visual feedback, or may perform one of transmission of a second control signal and displaying of a visual feedback first.

According to an embodiment of the present invention, additional visual feedback 1014*a* using a new object 1014*b* may be selectively provided. Referring to FIG. 10D, when the visual feedback 1014 is displayed, the new object 1014*b* is displayed adjacent to the object 711*b*. The new object 1014*b* is a full pipette that has suctioned a liquid. The controller may display the pipette 1014*b*, which gradually decreases in liquid content in response to the visual feedback 1014 by which the size of the object 711*b* is gradually expanded to a predetermined size. When the object 1011 is completely expanded to a predetermined size, the controller 110 may display an empty pipette 1014*c*, which no liquid. The controller may display the pipette 1014*c* for a predetermined time period (for example, 500 ms).

The controller 110 may perform a control to output haptic feedback through the vibration motor 164 as well as through visual feedback in response to the received copy command. The controller 110 may vibrate the vibration motor 164 to correspond to haptic information as shown in FIG. 11 to provide a haptic feedback. FIG. 11 is described in greater detail below with respect in step S905 of FIG. 9. The controller 110 may perform a control to output a sound source corresponding to auditory feedback through the speaker 163 as well as visual feedback in response to the received copy command.

In step S905 of FIG. 9, the input unit provides haptic feedback and auditory feedback.

Referring to FIGS. 10C and 11, the pen controller 510 may receive a control command in a Bluetooth SPP through the pen communication unit 520. The pen controller 510 may control such that the pen vibrating element 544 outputs haptic feedback corresponding to haptic information included in control information in response to the received control command.

The transverse axis (X axis) of FIG. 11 represents a vibration time period of the vibrating element 544, in units of 50 ms 1105*a*. The longitudinal axis (Y axis) represents a vibration intensity of the vibrating element 544, in units of 500 mV 1105*b*. It can be seen that the haptic waveform corresponding to the haptic information of FIG. 11 rapidly increases from 0 V to 1.3 V and gradually decreases to 0V in the vibration.

In a preprocessing section 1110*a*, the pen controller 510 may analyze and/or store control information received by the portable apparatus 100 and supply electric power to the pen vibrating element 544. For example, the preprocessing section 1110*a* may refer to a section before vibrations are generated in the pen vibrating element 544.

An acceleration section 1110*b* refers to a section in which a vibration time period and a vibration intensity of the pen vibrating element 544 increase. A maximum intensity 1110*d* of the acceleration section 1110*b* may be changed according to a file size and a copy processing time period included in the copy information. For example, the maximum acceleration section and the maximum intensity of the acceleration section whose file size is 1 MB may be greater than those of the acceleration section whose file size is 500 KB. The copy processing time period and the maximum intensity of the acceleration section whose copy processing time period is 1.5 s may be greater than those of the acceleration section whose copy processing time period is 500 ms.

A deceleration section 810*c* refers to a section in which vibrations of the pen vibrating element 544 corresponding to the maximum intensity 1110*d* decelerate. The pen controller 510 may complete outputting of haptic feedback in the deceleration section 1110*c*. The time axis of the deceleration section 1110*c* may be shorter than or equal to the time axis (X axis) of the acceleration section 810*b*. In an embodiment of the present invention, various haptic waveforms (for example, FIGS. 13 to 15) whose vibration time periods, vibration periods, vibration intensities are different may be stored in addition to FIG. 11, and another haptic waveform may be generated and stored by using a combination of the haptic waveforms (for example, FIGS. 13 to 15) that are stored in advance.

The pen controller 510 may perform a control to output auditory feedback corresponding to auditory information (for example, a sound source) included in control information, from the pen speaker 543, in response to the received control command. The pen controller 510 may perform a control to selectively output one of haptic feedback and auditory feedback.

In step S906 of FIG. 9, it is determined whether copy information including object data exists in the memory of the input unit.

The controller 110 may identify existence of copy information including object data in the pen memory 550 of the input unit 167 by using device information and copy information of the input unit 167 stored in advance.

According to the result of the determination, the controller 110 may request copy information including object data from the input unit 167 by using device information. In an embodiment of the present invention, it will be easily understood by those skilled in the art that the identification of copy information including object data may be performed in steps S901 to S904.

When it is determined that copy information including object data exists in the pen memory of the input unit in step S906, copy information including object data is received from the input unit, in step S907.

The controller 110 may perform a control to request and receive copy information including object data from the pen communication unit 520 of the input unit 167 in a Bluetooth SPP. The copy information may include object data, a file name, a file size, a file type, a file storage location, and a copy time period. The controller 110 stores copy information including the received object data in the storage. When copy information including object data is received from the input unit 167, the controller 110 may complete outputting of visual, haptic, and auditory feedback provided from the portable apparatus 100.

In step S908 of FIG. 9, an object is displayed.

Figure 10E:
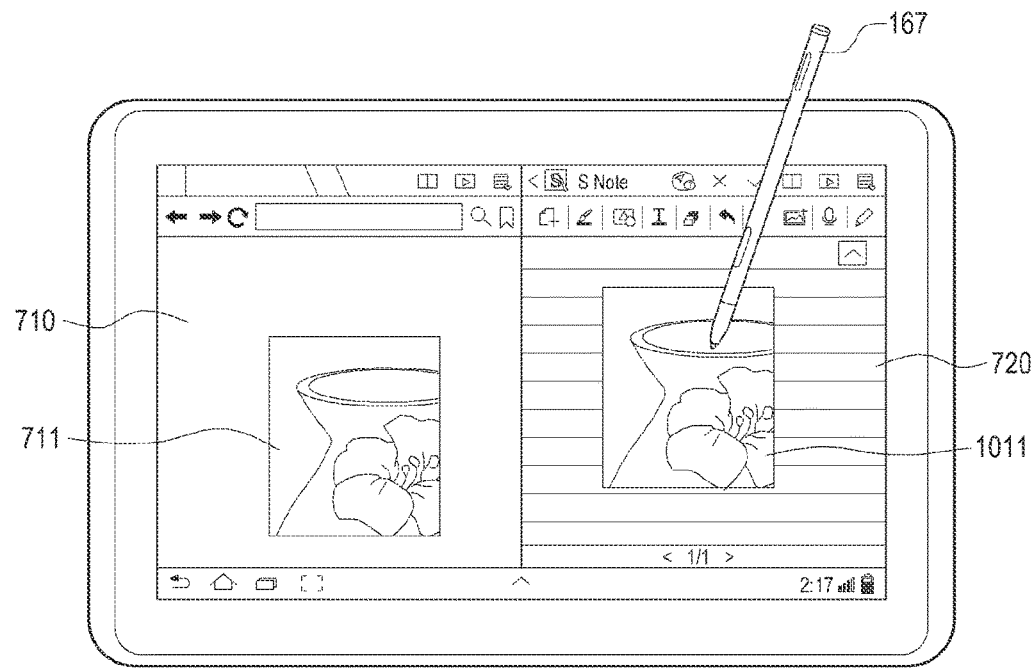

Referring to FIG. 10E, the controller 110 displays the object 1011 by using the received copy information. Two identical objects are displayed on the application screens 710 and 720 of the touch screen.

Returning to step S903 of FIG. 9, when a paste command is not received via a button of the input unit 167, it is determined whether a touch gesture of the input unit is detected, in step S909.

When a touch gesture of the input unit is not detected in step S909 of FIG. 9, the methodology terminates.

When a touch gesture (for example, a rotation, a flick, or a long press) by the input unit 167 is detected from the touch screen 190, the controller 110 may detect a continuous movement (for example, continuous X and Y coordinates corresponding to a movement of the touch gesture) (not shown) of the touch 1012 by using the touch screen 190 and the touch screen controller 195. The controller 110 may store a continuous movement starting from the detected touch 1012 in the storage. The continuous movement of the touch 1012 means that a contact on the touch screen is continued. For example, a long press may refer not to a continuous movement of a touch, but to a touch gesture whose touch maintenance time period is 2 s or more.

When a touch gesture of the input unit 167, which is hovering, is input to the touch screen 190, the controller may detect a continuous movement by using the pen recognition panel 191 and the touch screen controller. The controller may store a continuous movement starting from the detected hovering location in the storage.

It will be easily understood by those skilled in the art that a touch gesture may be changed through setting of an environment in step S909 of FIG. 9.

When a touch gesture of the input unit is detected in step S909 of FIG. 9, a copy icon is displayed, in step S910.

Figure 10F:
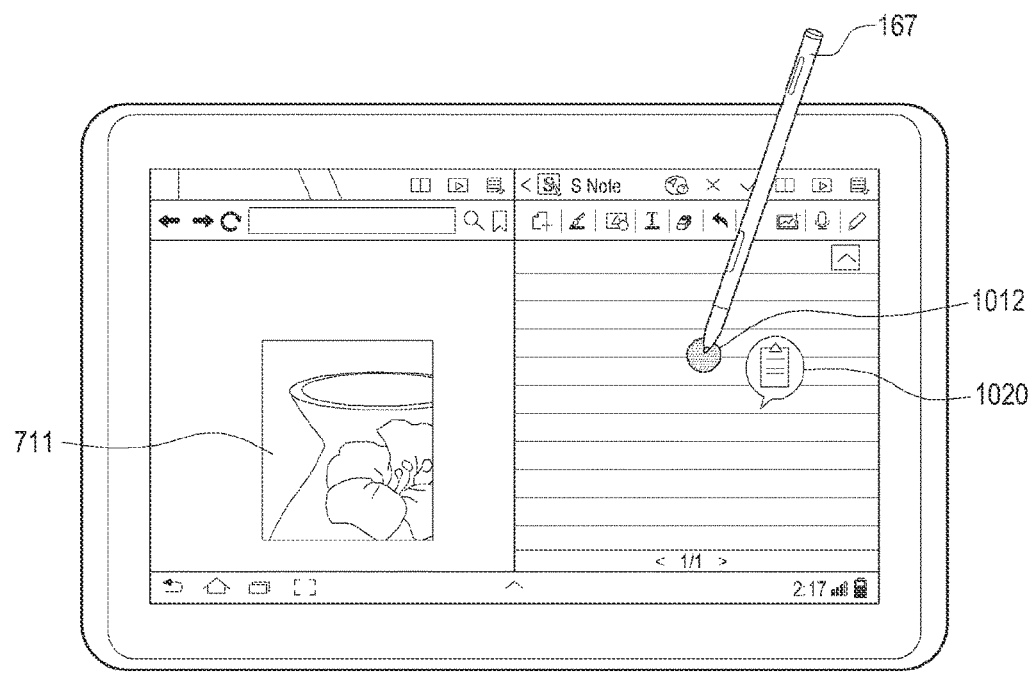

Referring to FIG. 10F, the controller may display a paste icon 1020 in response to an input touch gesture. It will be easily understood by those skilled in the art that the icon displayed in response to the touch gesture may be added, changed, or deleted to correspond to a performance or structure of the portable apparatus 100.

In step S911 of FIG. 9, a paste command is received via selection of the paste icon.

Figure 10G:
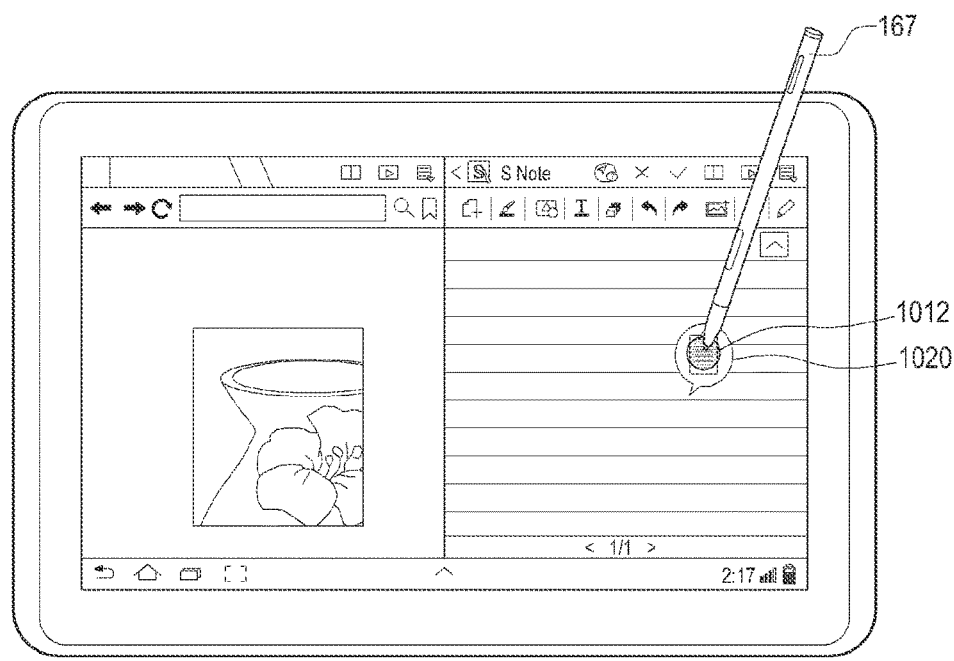

Referring to FIG. 10G, the paste icon 1020 is selected by the input unit 167. The controller 110 receives a paste command corresponding to the selection of the paste icon 1020 by the input unit 167. The controller 110 maps the received paste command with device information of the input unit 167 stored in advance to store the mapping result in the storage. When the paste icon 1020 is selected, the controller may perform a control not to display the icon group 720.

The controller 110 may perform a control to transmit a mode conversion signal of the input unit 167 corresponding to the input paste command to the input unit. The pen controller 510 converts an operation mode of the input unit 167 into a paste mode in response to the received mode conversion signal. When the button 542 is pressed by the user, the pen controller 510 may release a paste mode, which is an operation mode of the input unit 167.

When a paste icon 1020 is selected by the input unit 167 that is hovering, the controller 110 may perform a control to transmit a mode conversion signal of the input unit 167 corresponding to the input paste command to the input unit. The pen controller 510 converts an operation mode of the input unit 167 into a paste mode in response to the received mode conversion signal. When the button 542 is pressed by the user, the pen controller 510 may release a paste mode, which is an operation mode of the input unit 167.

When a paste command is input by selection of the paste icon in step S911 of FIG. 9, the methodology continues to step S904.

Returning to step S906 of FIG. 9, when copy information including object data does not exist in the memory of the input unit, copy information is received from an external server, in step S912.

The controller 110 may perform a control to request and receive first copy information without object data from the pen communication unit 520 of the input unit 167 in a Bluetooth SPP. The controller 110 may perform a control to request and receive a download of object data stored in an external server from the external server by using copy information stored in the storage in advance, an URL of the external server, and a communication unit.

It will be easily understood by those skilled in the art that in the present invention, a copy command, control information, and copy information are transmitted and received between the portable apparatus 100, the input unit 167, and the external server by using communication units of the portable apparatus 100, the input unit 167, and the external server which support various communication methods and the transmission/reception method is not limited to the Bluetooth.

The controller 110 may store object data received from an external server and first copy information received from the input unit in the storage. When object data is completely received from an external server and first copy information is completely received from the input unit 167, the controller may complete outputting of visual, haptic, and auditory feedbacks provided by the portable apparatus 100.

In step S912 of FIG. 9, when copy information is received from an external server and the input unit, step S908 is performed.

Figure 12:
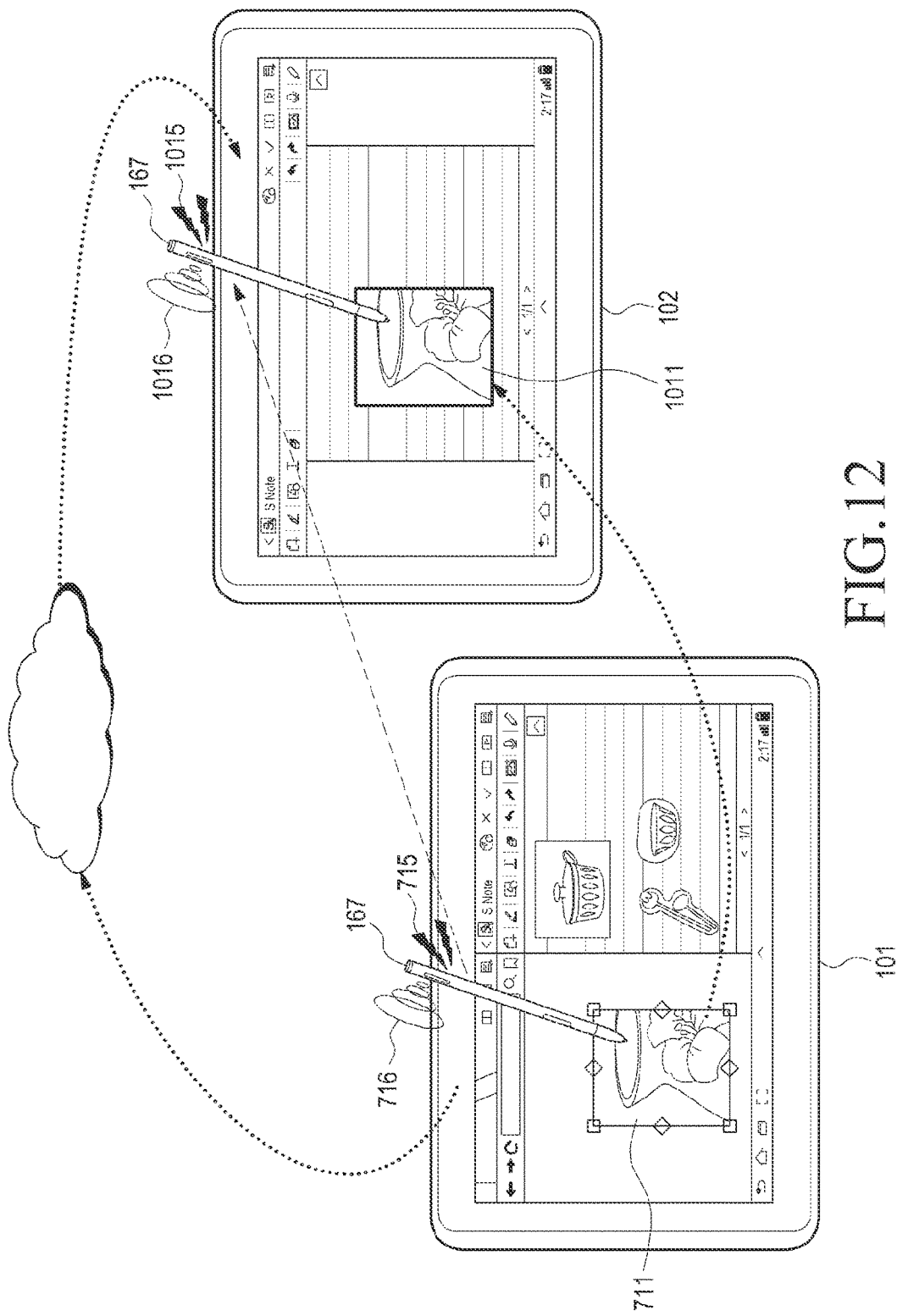
FIG. 12 is a diagram illustrating a feedback providing method of a portable apparatus, according to an embodiment of the present invention.

FIG. 12 is a diagram illustrating a feedback providing method of a portable apparatus, according to an embodiment of the present invention.

Referring to FIG. 12, this method is a feedback providing method provided between a plurality of portable terminals.

Referring to FIG. 12, feedback corresponding to a copy & paste action using the input unit 167 may be provided between a plurality of portable apparatuses 101 and 102. When a residual size of a memory of the input unit 167 is sufficient, a controller of a first portable apparatus 101 may transmit control information corresponding to the object 711 selected by the input unit 167 and copy information including object data to the input unit 167 in a Bluetooth SPP. A controller of a second portable apparatus 102 can recognize that the input unit 167 has copy information through discovery and pairing with the input unit 167. The controller of the second portable apparatus 102 may receive control information and copy information from the input unit 167 in a Bluetooth SPP to correspond to a paste command of the input unit 167.

When the residual size of the memory of the input unit 167 is not sufficient, the controller of the first portable apparatus 101 may transmit control information corresponding to the object 711 selected by the input unit 167 and first copy information excluding object data to the input unit 167 in a Bluetooth Serial Port Profile (SPP). The controller of the first portable apparatus 101 may transmit object data to an external server through a communication unit. The controller of the first portable apparatus 101 may transmit object data to the second portable apparatus 102 through a communication unit.

The controller of the second portable apparatus 102 can recognize that the input unit 167 has copy information through discovery and paring with the input unit 167. The controller of the second portable apparatus 102 may receive control information and first copy information from the input unit 167 in a Bluetooth SPP to correspond to a paste command of the input unit 167. The controller of the second portable apparatus 102 may receive object data from an external server through a communication unit. The controller of the second portable apparatus 101 may receive object data from the first portable apparatus 101 through a communication unit.

The feedback providing method between a plurality of portable apparatuses is substantially the same as the feedback providing method (for example, selection of an object to be copied, transmission/reception of a copy command corresponding to a copy of an object, selection of haptic feedback, a control command, copy information, and a paste location, transmission and reception of a paste command corresponding to a paste of an object, haptic feedback, a control command, and copy information) of one portable apparatus.

Figure 13:
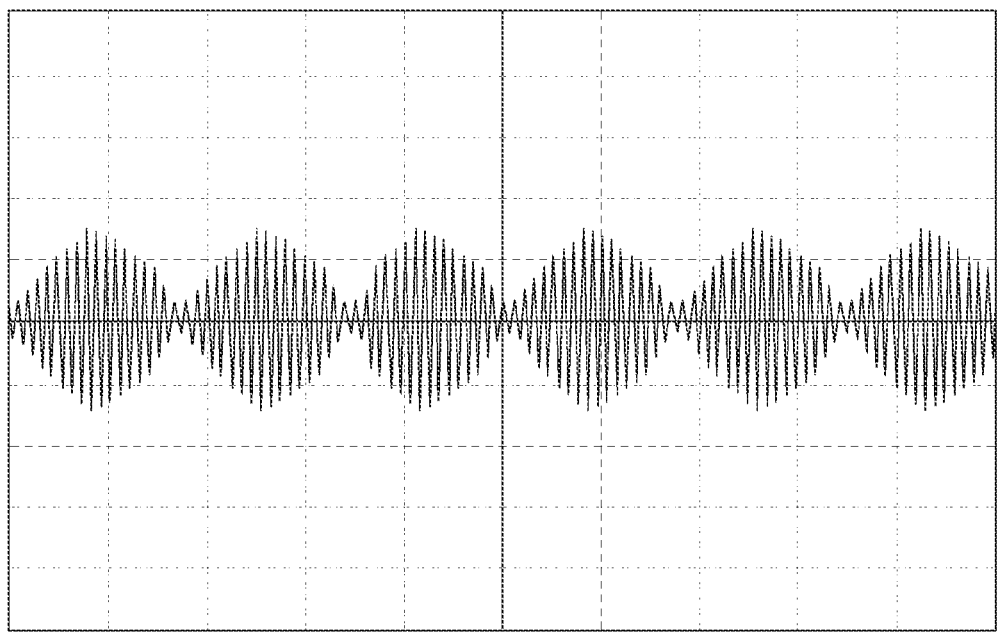
FIGS. 13 to 15 show examples of haptic waveforms of a portable apparatus, according to embodiments of the present invention.
Figure 14:
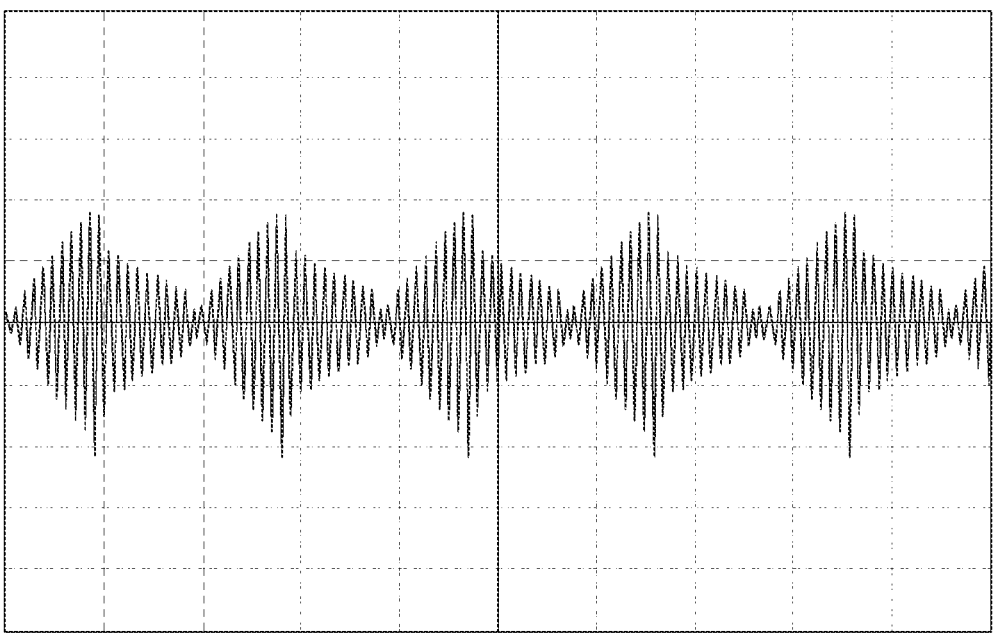
Figure 15:
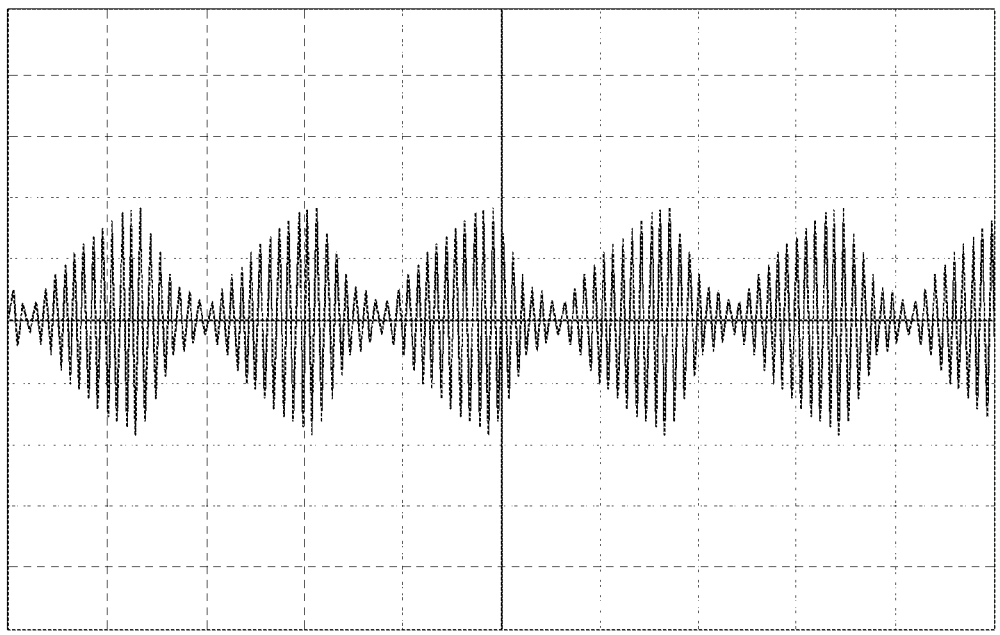

FIGS. 13 to 15 show examples of haptic waveforms of a portable apparatus, according to embodiments of the present invention.

Referring to FIGS. 8 and 11, it can be seen that haptic waveforms of FIGS. 13 to 15 are periodically repeated a plurality of times. The transverse axis of FIGS. 13 to 15 represents a vibration time of the vibrating element 544, in units of 50 ms. The longitudinal axis of FIGS. 13 to 15 represents a vibration intensity of the vibrating element 544, in units of 500 mV.

The haptic waveform of FIG. 13 is a repeated vibration whose intensity gradually increases from 0 V to 800 mV, gradually decreases, and then increases again. The acceleration section and the deceleration section of FIG. 13 are symmetrical.

The haptic waveform of FIG. 14 is a repeated vibration whose intensity gradually increases from 0 V to 900 mV, rapidly decreases to 500 mV, gradually decreases to 200 mV, and then increases again.

The haptic waveform of FIG. 15 is a repeated vibration whose intensity gradually increases from 0 V to 950 mV, rapidly decreases to 100 mV, and then increases again.

It will be easily understood by those skilled in the art that in an embodiment of the present invention, in addition to FIGS. 13 to 15, various haptic waveforms having different vibration time periods, vibration periods, and vibration intensities may be stored and other haptic waveforms may be generated and stored through a combination of the various haptic waveforms that are stored in advance.

It will be appreciated that embodiments can be realized in the form of hardware, software or a combination of hardware and software. In particular, methods according to certain embodiments can be realized in the form of program instructions, which are executable through various computer units and can be recorded in a computer readable medium. The computer readable medium can include a program instruction, a data file, and a data structure alone or through a combination thereof. The program instruction recorded in the medium can be specifically designed for embodiments of the present invention or are well known to those skilled in the field of computer software.

Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, certain embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

While the invention has been shown and described with reference to certain embodiments thereof, it will be understood by those skilled in the art that various changes in form and detail may be made therein without departing from the spirit and scope of the invention as defined by the appended claims.

Features, integers or characteristics described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

What is claimed is:

1. A method for controlling, by an electronic device, an input unit which performs wireless communications with the electronic device, the method comprising:

displaying at least one object on a touch screen of the electronic device;

identifying a first touch by the input unit at a position corresponding to the object displayed on the touch screen;

identifying the object based on the first touch by the input unit;

receiving, from the input unit via the wireless communications, a copy command to copy the identified object;

in response to receiving the copy command, displaying visual feedback on the touch screen of the electronic device including a pipette indicating that a size of the identified object is gradually reduced to a predetermined size;

storing the identified object in a memory of the electronic device;

transmitting, to the input unit via the wireless communications, a first control signal for outputting the haptic feedback at the input unit;

transmitting, to the input unit via the wireless communications, copy information corresponding to the stored object;

identifying a second touch by the input unit on the touch screen where the stored object is to be displayed;

receiving, from the input unit via the wireless communications, a paste command by which the stored object is to be pasted; and displaying the stored object at a location on the touch screen of the electronic device based on the identified second touch.

2. The method of claim 1, wherein the first touch comprises hovering by the input unit.

3. The method of claim 1, wherein a time period during which the pipette is displayed is determined based on one of a file size corresponding to the identified object or a copy processing time period.

4. The method of claim 1, further comprising:

transmitting copy information corresponding to the stored object to an external server, wherein the copy information comprises information of at least two types selected from: object data, a file name, a file size, a file type, a file storage location, or a copy time period corresponding to the stored object.

5. The method of claim 4, further comprising:

receiving, from the input unit via the wireless communications, device information of the input unit;

wherein the copy information is received from the external server based on the device information of the input unit.

6. The method of claim 5, wherein some of the copy information is transmitted to the input unit based on the device information, and remaining copy information is transmitted to the external server based on the device information.

7. The method of claim 1, wherein the copy command is provided via one of a button of the input unit or a touch gesture by the input unit.

8. The method of claim 7, wherein a selectable copy icon, corresponding to execution of a copy of the identified object, is displayed adjacent to the identified object in response to the touch gesture of the input unit.

9. The method of claim 1, further comprising:

transmitting, to the input unit via the wireless communications, a second control signal corresponding to feedback determined in response to the received paste command.

10. The method of claim 9, wherein the second touch by the input unit comprises hovering by the input unit.

11. The method of claim 1, further comprising:

displaying visual feedback corresponding to the paste command on the touch screen.

12. The method of claim 11, wherein the visual feedback corresponding to the paste command comprises visual feedback which enlarges the predetermined smaller size of the identified object to the original size at a constant rate and moves the identified object to the location based on the detected second touch.

13. The method of claim 11, wherein the visual feedback corresponding to the paste command comprises visual feedback of a new object, which comprises decreasing an amount of liquid in the pipette, and a time period during which the pipette is displayed is based on one of a file size corresponding to the copied object or a paste processing time period.

14. The method of claim 9, further comprising:

receiving copy information corresponding to the paste command from one of the input unit or an external server, wherein the copy information comprises at least two of object data, a file name, a file size, a file type, a file storage location, or a copy time period corresponding to the object to be copied.

15. An electronic device for controlling an input unit which performs wireless communications with the electronic device, the electronic device comprising:

a touch screen;

a communication unit; and a processor configured to:

control the touch screen to display at least one object, identify a first touch by the input unit at a position corresponding to the object displayed on the touch screen, identify the object based on the first touch by the input unit, control the communication unit to receive, from the input unit, a copy command to copy the identified object via the communication unit which performs the wireless communications with the input unit, in response to receiving the copy command, control the touch screen to display visual feedback on the touch screen of the electronic device including a pipette indicating that a size of the identified object is gradually reduced to a predetermined size, store the identified object in a memory of the electronic device, control the communication unit to transmit, to the input unit, a first control signal for outputting the haptic feedback at the input unit, control the communication unit to transmit, to the input unit, copy information corresponding to the stored object, identify a second touch by the input unit on the touch screen where the stored object is to be displayed, control the communication unit to receive, from the input unit via the communication unit, a paste command by which the stored object is to be pasted, and control the touch screen to display the stored object at a location on the touch screen of the electronic device based on the identified second touch.

16. The electronic device of claim 15, wherein the processor is further configured to output auditory feedback corresponding to the copy command from a speaker of the electronic device.

17. The electronic device of claim 15, wherein the processor is further configured to control the communication unit to receive device information of the input unit, from the input unit via the communication unit, and to transmit at least some of copy information corresponding to the stored object to the input unit based on the device information.

18. The electronic device of claim 15, wherein the processor is further configured to control the communication unit to transmit a second control signal to the input unit, the second control signal corresponding to feedback determined in response to a paste command for pasting the copied object received from the input unit.

19. The electronic device of claim 15, wherein the processor is further configured to control to output at least one visual feedback of the touch screen or auditory feedback of a speaker in response to the paste command.

20. A method for providing feedback of an input unit which Performs wireless communications with an electronic device, the method comprising:
transmitting, to the electronic device via the wireless communications, a copy command for copying an object identified from at least one object displayed on a touch screen of the electronic device so that the electronic device displays visual feedback including a pipette indicating that a size of the identified object is gradually reduced to a predetermined size;
receiving, from the electronic device via the wireless communications, a first control signal for outputting haptic feedback at the input unit in response to the transmitted copy command;
outputting the haptic feedback corresponding to the received first control signal through a pen vibrating element of the input unit;
receiving, from the electronic device via the wireless communications, copy information corresponding to the identified object;
transmitting, to the electronic device via the wireless communications, a paste command for pasting the copied object being stored in a memory of the electronic device at a location on the touch screen of the electronic device;
receiving, from the electronic device via the wireless communications, a second control signal corresponding to the paste command; and
outputting haptic feedback corresponding to the received second control signal.

21. The method of claim 20, further comprising:
outputting an auditory feedback corresponding to the received first control signal or second control signal through a pen speaker of the input unit.

22. An input unit for providing feedback via wireless communications with an electronic device, the input unit comprising:
a pen vibrating element;
a pen communication unit; and
a processor configured to:
control the pen communication unit to wirelessly communicate with an electronic device,
control the pen communication unit to transmit, to the electronic device via the wireless communications, a copy command for copying an object identified from at least one object displayed on a touch screen of the electronic device so that the electronic device displays visual feedback including a pipette indicating that a size of the identified object is gradually reduced to a predetermined size,
control the pen communication unit to receive, from the electronic device via the wireless communications, a first control signal for outputting haptic feedback at the input unit in response to the transmitted copy command,
control the pen vibrating element to output the haptic feedback corresponding to the received control signal via the wireless communications,
control the pen communication unit to receive, from the electronic device, copy information corresponding to the identified object,
control the pen communication unit to transmit, to the electronic device via the wireless communications, a paste command for pasting the copied object being stored in a memory of the electronic device at a location on the touch screen of the electronic device,
control the pen communication unit to receive, via the wireless communications, a second control signal corresponding to the paste command from the electronic device, and
control the pen vibrating element to output haptic feedback corresponding to the received second control signal.

23. The input unit of claim 22, further comprising:
a pen speaker,
wherein the processor is further configured to control the pen speaker to output auditory feedback corresponding to the first control signal.

* * * * *